US010018239B2

(12) United States Patent
Fox

(10) Patent No.: US 10,018,239 B2
(45) Date of Patent: *Jul. 10, 2018

(54) TRAVEL CONTROL FOR A GAS SPRING AND GAS SPRING HAVING VERY SHORT TRAVEL MODES

(71) Applicant: Fox Factory, Inc., Scotts Valley, CA (US)

(72) Inventor: Robert C. Fox, Scotts Valley, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,765

(22) Filed: Nov. 2, 2015

(65) Prior Publication Data

US 2016/0053842 A1 Feb. 25, 2016

Related U.S. Application Data

(63) Continuation of application No. 14/086,649, filed on Nov. 21, 2013, now Pat. No. 9,182,002, which is a continuation of application No. 13/164,065, filed on Jun. 20, 2011, now Pat. No. 8,608,141, which is a continuation of application No. 11/669,862, filed on Jan. 31, 2007, now Pat. No. 7,963,509.

(51) Int. Cl.
*F16F 9/06* (2006.01)
*B62K 25/06* (2006.01)

(52) U.S. Cl.
CPC .............. *F16F 9/061* (2013.01); *B62K 25/06* (2013.01)

(58) Field of Classification Search
CPC .. F16F 9/061; F16F 9/064; F16F 9/065; F16F 9/068; B62K 25/06; B62K 25/08
See application file for complete search history.

(56) References Cited

U.S. PATENT DOCUMENTS

| 865,151 A | 9/1907 | Andrew |
| 1,094,567 A | 4/1914 | Hofmann |
| 1,281,079 A | 10/1918 | Sears |
| 1,492,328 A | 4/1924 | Lang |
| 1,946,882 A | 2/1934 | Sherman |
| 1,984,144 A | 12/1934 | Laugaudin |
| 1,992,490 A | 2/1935 | Lewis |
| 2,101,265 A | 12/1937 | Mercier |
| 2,115,072 A | 4/1938 | Hunt et al. |
| 2,265,435 A | 12/1941 | Kinzie et al. |
| 2,329,803 A | 9/1943 | Whisler, Jr. |
| 2,528,822 A | 11/1950 | Dunn |
| 2,569,503 A | 10/1951 | Thelander |

(Continued)

FOREIGN PATENT DOCUMENTS

| CA | 2222445 C | 11/2004 |
| DE | 725659 C | 9/1942 |

(Continued)

OTHER PUBLICATIONS

"Cane Creek", Cane Creek—AD-10 and AD-12 literature (6 pages).

(Continued)

*Primary Examiner* — Thomas J Williams

(57) ABSTRACT

A gas spring capbale of having long and short travel modes is described. The gas spring uses liquid in combination with pressurized air to affect the travel length. Unlike conventional gas springs, the gas spring according to the invention may have its travel reduced more than for example, by 50%.

4 Claims, 17 Drawing Sheets

(56) References Cited

U.S. PATENT DOCUMENTS

| | | |
|---|---|---|
| 2,774,448 A | 12/1956 | Hultin |
| 2,894,742 A | 7/1959 | Peterson |
| 2,944,639 A | 7/1960 | Blake |
| 3,001,538 A | 9/1961 | Du |
| 3,039,761 A | 6/1962 | Zijp |
| 3,085,771 A | 4/1963 | Peterson |
| 3,086,786 A | 4/1963 | Tuczek |
| 3,114,705 A | 12/1963 | Prihonic et al. |
| 3,146,862 A | 9/1964 | Winsen |
| 3,201,110 A | 8/1965 | Taccone |
| 3,202,413 A | 8/1965 | Colmerauer |
| 3,237,726 A | 3/1966 | Deyerling |
| 3,319,741 A | 5/1967 | Hauck |
| 3,338,347 A | 8/1967 | Avner |
| 3,379,430 A | 4/1968 | Hennells |
| 3,414,092 A | 12/1968 | Speckhart |
| 3,711,054 A | 1/1973 | Bauer |
| 3,722,875 A | 3/1973 | Hasse |
| 3,836,132 A | 9/1974 | McNally et al. |
| 3,854,710 A | 12/1974 | Nicholls |
| 3,856,287 A | 12/1974 | Freitag |
| 3,873,122 A | 3/1975 | Fischer |
| 3,889,934 A | 6/1975 | Kamman |
| 3,970,292 A | 7/1976 | Dachicourt et al. |
| RE29,055 E | 11/1976 | Wagner |
| 4,029,306 A | 6/1977 | Sakaguchi et al. |
| 4,122,923 A | 10/1978 | Ellis et al. |
| 4,132,395 A | 1/1979 | Fox |
| 4,145,067 A | 3/1979 | Ceriani |
| 4,153,266 A | 5/1979 | Uhls |
| 4,159,105 A | 6/1979 | Vander Laan et al. |
| 4,159,756 A | 7/1979 | Murakami et al. |
| 4,206,934 A | 6/1980 | McKee |
| 4,254,849 A | 3/1981 | Pohlenz |
| 4,256,293 A | 3/1981 | Burgess |
| 4,273,310 A | 6/1981 | Ginzler |
| 4,295,658 A | 10/1981 | Kashima |
| 4,298,101 A | 11/1981 | Dressell et al. |
| 4,313,529 A | 2/1982 | Kato et al. |
| 4,325,541 A | 4/1982 | Korosladanyi et al. |
| 4,334,600 A | 6/1982 | Palitto |
| 4,337,849 A | 7/1982 | Siorek et al. |
| 4,386,766 A | 6/1983 | Bauer et al. |
| 4,390,159 A | 6/1983 | Duncan |
| 4,405,119 A | 9/1983 | Masclet et al. |
| 4,438,909 A | 3/1984 | Matsumoto |
| 4,452,117 A | 6/1984 | Brickner et al. |
| 4,452,177 A | 6/1984 | Plett et al. |
| 4,457,340 A | 7/1984 | Krueger |
| 4,492,290 A | 1/1985 | Zavodny |
| 4,509,730 A | 4/1985 | Shtarkman |
| 4,527,676 A | 7/1985 | Emura et al. |
| 4,530,425 A | 7/1985 | Veaux et al. |
| 4,534,580 A | 8/1985 | Kobayashi et al. |
| 4,558,587 A | 12/1985 | Fruzzetti |
| 4,572,317 A | 2/1986 | Isono et al. |
| 4,576,258 A | 3/1986 | Spisak et al. |
| 4,591,186 A | 5/1986 | Ashiba |
| 4,592,540 A | 6/1986 | Yokoya et al. |
| 4,598,929 A | 7/1986 | Kumagai et al. |
| 4,606,440 A | 8/1986 | Buchanan et al. |
| 4,613,116 A | 9/1986 | Buma |
| 4,616,811 A | 10/1986 | Buma |
| 4,620,619 A | 11/1986 | Emura et al. |
| 4,629,170 A | 12/1986 | Warmuth |
| 4,631,116 A | 12/1986 | Ludwig |
| 4,635,906 A | 1/1987 | Buma |
| 4,647,069 A | 3/1987 | Iijima |
| 4,650,202 A | 3/1987 | Tsuzuki |
| 4,650,212 A | 3/1987 | Yoshimura |
| 4,651,977 A | 3/1987 | Buma |
| 4,653,735 A | 3/1987 | Buma |
| 4,659,070 A | 4/1987 | Buma |
| 4,660,688 A | 4/1987 | Spisak et al. |
| 4,660,810 A | 4/1987 | Buma |
| 4,666,135 A | 5/1987 | Buma et al. |
| 4,667,696 A | 5/1987 | Van |
| 4,671,534 A | 6/1987 | Yano |
| 4,673,171 A | 6/1987 | Buma |
| 4,686,135 A | 8/1987 | Obayashi et al. |
| 4,686,626 A | 8/1987 | Kuroki et al. |
| 4,697,796 A | 10/1987 | Kitamura et al. |
| 4,717,173 A | 1/1988 | Sugasawa et al. |
| 4,735,401 A | 4/1988 | Buma et al. |
| 4,741,554 A | 5/1988 | Okamoto |
| 4,743,000 A | 5/1988 | Karnopp |
| 4,746,106 A | 5/1988 | Fukumura |
| 4,768,758 A | 9/1988 | Buma |
| 4,773,635 A | 9/1988 | Buma |
| 4,787,644 A | 11/1988 | Yokote et al. |
| 4,789,051 A | 12/1988 | Kruckemeyer et al. |
| 4,827,416 A | 5/1989 | Kawagoe et al. |
| 4,828,464 A | 5/1989 | Maier et al. |
| 4,838,306 A | 6/1989 | Horn et al. |
| 4,844,428 A | 7/1989 | Margolis et al. |
| 4,899,853 A | 2/1990 | Hummel |
| 4,901,986 A | 2/1990 | Smith |
| 4,915,364 A | 4/1990 | Perlini |
| 4,917,222 A | 4/1990 | Bacardit |
| 4,936,423 A | 6/1990 | Karnopp |
| 4,936,424 A | 6/1990 | Costa |
| 4,944,705 A | 7/1990 | Kashima et al. |
| 4,948,104 A | 8/1990 | Wirges |
| 4,958,706 A | 9/1990 | Richardson et al. |
| 4,974,820 A | 12/1990 | Nakanishi |
| 4,993,523 A | 2/1991 | Schwemmer et al. |
| 4,999,872 A | 3/1991 | Jentsch |
| 5,037,062 A | 8/1991 | Neuhaus |
| 5,067,517 A | 11/1991 | Ting-Chin et al. |
| 5,067,518 A | 11/1991 | Kosmyna |
| 5,072,813 A | 12/1991 | Yoshioka et al. |
| 5,080,205 A | 1/1992 | Miller et al. |
| 5,111,735 A | 5/1992 | Johnson |
| 5,139,119 A | 8/1992 | Karnopp |
| 5,150,775 A | 9/1992 | Charles et al. |
| 5,158,270 A | 10/1992 | Lin |
| 5,163,538 A | 11/1992 | Derr et al. |
| 5,169,129 A | 12/1992 | Hoffman |
| 5,180,186 A | 1/1993 | Charles et al. |
| 5,186,481 A | 2/1993 | Turner |
| 5,201,388 A | 4/1993 | Malm |
| 5,201,389 A | 4/1993 | Miller et al. |
| 5,228,640 A | 7/1993 | Mouille |
| 5,251,927 A | 10/1993 | Charles et al. |
| 5,275,264 A | 1/1994 | Isella |
| 5,279,480 A | 1/1994 | Derrien et al. |
| 5,285,875 A | 2/1994 | Munoz |
| 5,285,876 A | 2/1994 | Shimizu et al. |
| 5,296,089 A | 3/1994 | Chen et al. |
| 5,306,122 A | 4/1994 | Gebauer et al. |
| 5,332,068 A | 7/1994 | Richardson et al. |
| 5,346,236 A | 9/1994 | Ohma |
| 5,360,089 A | 11/1994 | Nakamura et al. |
| 5,386,893 A | 2/1995 | Feigel |
| 5,396,973 A | 3/1995 | Schwemmer et al. |
| 5,404,972 A | 4/1995 | Popjoy et al. |
| 5,413,316 A | 5/1995 | Easter |
| 5,428,533 A | 6/1995 | Ogawa |
| 5,449,188 A | 9/1995 | Ohma |
| 5,456,480 A | 10/1995 | Turner et al. |
| 5,462,140 A | 10/1995 | Cazort et al. |
| 5,470,090 A | 11/1995 | Stewart et al. |
| 5,509,674 A | 4/1996 | Browning |
| 5,529,152 A | 6/1996 | Hamilton et al. |
| 5,533,597 A | 7/1996 | Nezu et al. |
| 5,538,276 A | 7/1996 | Tullis |
| 5,585,876 A | 12/1996 | Kobayashi |
| 5,586,781 A | 12/1996 | Anderson |
| 5,598,903 A | 2/1997 | Richardson |
| 5,632,471 A | 5/1997 | Pradel |
| 5,653,315 A | 8/1997 | Ekquist et al. |
| 5,725,226 A | 3/1998 | Cabrerizo-Pariente et al. |
| 5,775,677 A | 7/1998 | Englund |
| 5,799,758 A | 9/1998 | Huang |

(56) References Cited

U.S. PATENT DOCUMENTS

| | | |
|---|---|---|
| 5,803,482 A | 9/1998 | Kim |
| 5,823,305 A | 10/1998 | Richardson et al. |
| 5,842,688 A | 12/1998 | Dore et al. |
| 5,862,895 A | 1/1999 | Ricard |
| 5,915,674 A | 6/1999 | Wolf et al. |
| 5,921,572 A | 7/1999 | Bard et al. |
| 5,954,167 A | 9/1999 | Richardson et al. |
| 5,957,252 A | 9/1999 | Berthold |
| 5,971,116 A | 10/1999 | Franklin |
| 5,996,978 A | 12/1999 | Asanuma et al. |
| 6,010,119 A | 1/2000 | Hsiao |
| 6,029,958 A | 2/2000 | Larsson et al. |
| 6,050,583 A | 4/2000 | Bohn |
| 6,073,736 A | 6/2000 | Franklin |
| 6,095,541 A | 8/2000 | Turner et al. |
| 6,105,987 A | 8/2000 | Turner |
| 6,105,988 A | 8/2000 | Turner et al. |
| 6,109,400 A | 8/2000 | Ayyildiz et al. |
| 6,119,830 A | 9/2000 | Richardson et al. |
| 6,135,434 A | 10/2000 | Marking |
| 6,149,125 A | 11/2000 | Nilsson |
| 6,149,174 A | 11/2000 | Bohn |
| 6,234,461 B1 | 5/2001 | Böhm et al. |
| 6,254,067 B1 | 7/2001 | Yih |
| 6,267,400 B1 | 7/2001 | McAndrews |
| 6,279,703 B1 | 8/2001 | Mete |
| 6,296,092 B1 | 10/2001 | Marking et al. |
| 6,311,962 B1 | 11/2001 | Marking |
| 6,318,525 B1 | 11/2001 | Vignocchi et al. |
| 6,334,600 B1 | 1/2002 | Sakamoto |
| 6,340,153 B1 | 1/2002 | Miesner |
| 6,343,807 B1 | 2/2002 | Rathbun |
| 6,360,857 B1 | 3/2002 | Fox et al. |
| 6,386,525 B1 | 5/2002 | Stuart |
| 6,412,615 B1 | 7/2002 | Perez |
| 6,412,759 B1 | 7/2002 | Krauss |
| 6,415,895 B2 | 7/2002 | Marking et al. |
| 6,457,730 B1 | 10/2002 | Urbach |
| 6,464,053 B1 | 10/2002 | Hoebrechts |
| 6,464,201 B2 | 10/2002 | Job |
| 6,467,592 B1 | 10/2002 | Dernebo |
| 6,491,146 B1 | 12/2002 | Yi et al. |
| 6,505,719 B2 | 1/2003 | Gonzalez et al. |
| 6,508,460 B2 | 1/2003 | Job |
| 6,543,754 B2 | 4/2003 | Ogura |
| 6,543,799 B2 | 4/2003 | Miyoshi |
| 6,581,948 B2 | 6/2003 | Fox |
| 6,592,136 B2 | 7/2003 | Becker et al. |
| 6,595,537 B2 | 7/2003 | Miyoshi et al. |
| 6,604,751 B2 | 8/2003 | Fox |
| 6,612,599 B2 | 9/2003 | Miyoshi |
| 6,619,684 B2 | 9/2003 | Miyoshi |
| 6,648,109 B2 | 11/2003 | Farr et al. |
| 6,659,240 B2 | 12/2003 | Dernebo |
| 6,659,241 B2 | 12/2003 | Sendrea |
| 6,669,219 B2 | 12/2003 | Turner et al. |
| 6,688,626 B2 | 2/2004 | Felsl et al. |
| 6,698,730 B2 | 3/2004 | Easter |
| 6,698,780 B2 | 3/2004 | Miyoshi |
| 6,708,803 B2 | 3/2004 | Jensen |
| 6,708,999 B1 | 3/2004 | Baltes et al. |
| 6,722,678 B2 | 4/2004 | McAndrews |
| 6,786,498 B1 | 9/2004 | Chang |
| 6,824,146 B2 | 11/2004 | Kang |
| 6,824,154 B1 | 11/2004 | Turner |
| 6,863,291 B2 | 3/2005 | Miyoshi |
| 6,866,281 B2 | 3/2005 | Chamberlain et al. |
| 6,883,650 B2 | 4/2005 | Van Wonderen et al. |
| 6,883,810 B2 | 4/2005 | Svartz et al. |
| 6,938,887 B2 | 9/2005 | Achenbach |
| 6,974,001 B2 | 12/2005 | Bauman |
| 6,976,692 B2 | 12/2005 | Miyoshi et al. |
| 6,978,872 B2 | 12/2005 | Turner |
| 6,991,076 B2 | 1/2006 | McAndrews |
| 6,991,621 B2 | 1/2006 | Bacher et al. |
| 7,000,907 B2 | 2/2006 | Achenbach |
| 7,011,193 B2 | 3/2006 | Lemmens et al. |
| 7,011,325 B2 | 3/2006 | Kinzler et al. |
| 7,017,893 B1 | 3/2006 | Vincenzo |
| 7,017,928 B2 | 3/2006 | Felsl et al. |
| 7,021,434 B2 | 4/2006 | Beck |
| 7,128,192 B2 | 10/2006 | Fox |
| 7,163,223 B2 | 1/2007 | Wesling et al. |
| 7,182,358 B2 | 2/2007 | Felsl et al. |
| 7,188,712 B2 | 3/2007 | Vogelsang et al. |
| 7,195,234 B2 | 3/2007 | Jordan et al. |
| 7,219,881 B2 | 5/2007 | Denk |
| 7,299,908 B2 | 11/2007 | Achenbach |
| 7,374,028 B2 | 5/2008 | Fox |
| 7,401,800 B2 | 7/2008 | Jordan |
| 7,441,638 B2 | 10/2008 | Hanawa |
| 7,703,585 B2 | 4/2010 | Fox |
| 7,870,936 B2 | 1/2011 | Shipman |
| 7,963,509 B2 | 6/2011 | Fox et al. |
| 8,464,850 B2 | 6/2013 | Fox |
| 8,608,141 B2 | 12/2013 | Fox et al. |
| 8,752,681 B2 | 6/2014 | Fox |
| 9,182,002 B2 | 11/2015 | Fox |
| 2002/0117830 A1 | 8/2002 | Holt et al. |
| 2002/0175035 A1 | 11/2002 | Achenbach |
| 2003/0234144 A1 | 12/2003 | Fox |
| 2004/0020730 A1 | 2/2004 | Turner |
| 2004/0061303 A1 | 4/2004 | Felsl et al. |
| 2004/0094376 A1 | 5/2004 | Van Wonderen et al. |
| 2004/0163905 A1 | 8/2004 | Braswell et al. |
| 2004/0222056 A1 | 11/2004 | Fox |
| 2004/0232650 A1 | 11/2004 | Felsl et al. |
| 2004/0245746 A1 | 12/2004 | Chamberlain et al. |
| 2004/0262879 A1 | 12/2004 | Kinzler et al. |
| 2005/0012255 A1 | 1/2005 | Denk |
| 2005/0012297 A1 | 1/2005 | Miyoshi et al. |
| 2005/0023094 A1 | 2/2005 | McAndrews |
| 2005/0056501 A1 | 3/2005 | De Molina |
| 2005/0104320 A1 | 5/2005 | Wesling et al. |
| 2005/0116399 A1 | 6/2005 | Jordan et al. |
| 2005/0173212 A1 | 8/2005 | Vogelsang et al. |
| 2005/0212187 A1 | 9/2005 | Achenbach |
| 2006/0289258 A1 | 12/2006 | Fox |
| 2007/0057420 A1 | 3/2007 | Jordan et al. |
| 2007/0090624 A1 | 4/2007 | Chen |
| 2008/0116622 A1 | 5/2008 | Fox |
| 2008/0179796 A1 | 7/2008 | Fox |
| 2008/0296814 A1 | 12/2008 | Franklin et al. |
| 2014/0077427 A1 | 3/2014 | Fox et al. |

FOREIGN PATENT DOCUMENTS

| | | |
|---|---|---|
| DE | 837508 C | 4/1952 |
| DE | 1455159 A1 | 3/1969 |
| DE | 3233160 A1 | 3/1984 |
| DE | 3840352 A1 | 6/1990 |
| DE | 4018712 A1 | 12/1991 |
| DE | 4123643 A1 | 6/1992 |
| DE | 4429562 A1 | 2/1996 |
| DE | 10236621 A1 | 3/2004 |
| DE | 10248253 A1 | 4/2004 |
| DE | 102004021586 A1 | 12/2005 |
| DE | 102010020057 A1 | 1/2011 |
| EP | 101589 A1 | 2/1984 |
| EP | 164189 A1 | 12/1985 |
| EP | 166702 A2 | 1/1986 |
| EP | 0245221 A2 | 11/1987 |
| EP | 342683 A2 | 11/1989 |
| EP | 0420610 A1 | 4/1991 |
| EP | 474171 A1 | 3/1992 |
| EP | 0541891 A1 | 5/1993 |
| EP | 666803 A1 | 8/1995 |
| EP | 0834448 A2 | 4/1998 |
| EP | 1464866 A2 | 10/2004 |
| ES | 8608123 A1 | 11/1986 |
| FI | 931949 A | 4/1993 |
| FR | 1174491 A | 3/1959 |
| FR | 2684957 A1 | 6/1993 |
| FR | 2725948 A1 | 4/1996 |

(56) References Cited

FOREIGN PATENT DOCUMENTS

| | | |
|---|---|---|
| FR | 2728948 A1 | 7/1996 |
| FR | 2753510 A1 | 3/1998 |
| FR | 2800702 A1 | 5/2001 |
| FR | 2863328 A1 | 6/2005 |
| FR | 2866628 A1 | 8/2005 |
| GB | 835151 A | 5/1960 |
| GB | 865151 A | 4/1961 |
| GB | 2206645 A | 1/1989 |
| GB | 2265435 A | 9/1993 |
| GB | 2286566 A | 8/1995 |
| IT | 1237933 B | 6/1993 |
| IT | 1247985 B | 1/1995 |
| JP | 5701008509 A | 1/1982 |
| JP | 57018509 Y2 | 4/1982 |
| JP | 59026639 A | 2/1984 |
| JP | 61135808 A | 6/1986 |
| JP | 61235212 A | 10/1986 |
| JP | 07167189 A | 7/1995 |
| SU | 623759 A1 | 9/1978 |
| WO | 9323283 A2 | 11/1993 |
| WO | 9903726 A1 | 1/1999 |
| WO | 9910223 A1 | 3/1999 |
| WO | 9914104 A1 | 3/1999 |
| WO | 9925989 A2 | 5/1999 |
| WO | 9958392 A1 | 11/1999 |
| WO | 0238437 A1 | 5/2002 |
| WO | 03029687 A1 | 4/2003 |
| WO | 2004016966 A1 | 2/2004 |
| WO | 2004041563 A1 | 5/2004 |
| WO | 2006054994 A1 | 5/2006 |

OTHER PUBLICATIONS

"Fox Factory", Fox Factory—DHX, Fox Factory 2008 Aftermarket Catalog (2 pages).
"Motorcycle Cruiser—"How to Improve the Ride and Suspension Performance of Cruiser Motorcycles"", Motorcycle Cruiser—"How to Improve the Ride and Suspension Performance of Cruiser Motorcycles", www.motorcyclecruiser.com/tech/improve_ride_suspension_performance, 2006 (2 pages).
"Motoxcross Museum—"The History of Fox Air Shocks"", Motoxcross Museum—"The History of Fox Air Shocks", 2001 (9 pages).
"Risee Racing Technology—"Remote Adjustable Air Chamber"", Risee Racing Technology—"Remote Adjustable Air Chamber", Webpage 1999/2005 (2 pages).
"Rock Shox", Rock Shox—Fork SID Manuals, 1998-2000 (15 pages).
"Sport Rider—"Suspension Tuning Guide—Learning the Lingo"", Sport Rider—"Suspension Tuning Guide—Learning the Lingo", www.sportrider.com/tech/146.0006.susp_lingo (2 pages).
Gieck, "Riding on Air: A History of Air suspension, Society of Automotive Engineers", Riding on Air: A History of Air suspension, Society of Automotive Engineers, Inc., 1999 (p. 222), p. 222.
Rosso, ""How to Set KTM Fork Oil Level"", Rosso, Mike—"How to Set KTM Fork Oil Level", www.4Strokes.com (1 page).
Sieman, ""Do it Yourself Tech—Dial in Your Forks"", Sieman, Rick—"Do it Yourself Tech—Dial in Your Forks", www.off-road.com/dirtbike/tech/forks, Jul. 1, 2005 (6 pages).
Bici Da Montagna—"Carrara 499 Piccante" (article in Italian), Mar. 1994.
FOX-various articles-Motocross Action Dec. 1981; Fox Factory 1983; Moto-X Fox 1981; Vanilla Float 1998; Mountain biking Oct. 1998; Cycle World Dec. 1981; undated.
Listing of Forks, undated, unidentified, 1987-1991.
Marzocchi literature—"Marzocchi '95: The Going Gets Rough"; "We Are the Champions", undated.
Office Action dated Feb. 26, 2009, U.S. Appl. No. 11/372,707.
Rock Shock Documents—various articles dated 1993, 1996-1998, 2000, 2004.
Showa Advertisement—Mountain Bike, 22-23, Jun. 1994 (3 pages).
Specification and drawing of Application—11372707.
Tutto Mountain Bike—"Turro Meteor" (article in Italian), Sep. 1992 (p. 57).
U.S. Appl. No. 11/372,707, filed Mar. 10, 2006.
"Bicycle Guide", "Suspension's Great for Paris-Roubaix, But What Does It Do for Me?", Bicycle Guide, Jul. 1994, pp. 29-32, and 39., Jul. 1994.
"Bicycling", Bicycling—Aug. 1993.
"Bike Pulse", Bike Pulse—"Rock Shock President Bryan Kelln", May 2000 (pp. 4-6 and 8), May 2000.
"Cannondale Documents-Various Articles", Cannodale documents—various articles dated 1993 and undated, 1993.
"Ceriani", Ceriani—various articles, undated.
"Mountain Bike", Mountain Bike—"The History of the Revolution", Aug. 2001 (pp. 34-36, 38, 40, 42); "Fork it over" (p. 12), Aug. 2001.
"Mountain Bike Action", Mountain Bike Action—various articles dated Feb. 1992, Jan. 1993, Nov. 1991, Jan. 1993, Dec. 1997, and Feb. 1991.
"Mountain Biking", Mountain Biking—Bulletin Board, "Smart Like a Fox", Oct. 1996 (p. 16), Oct. 1996.
"Road Bike", Road Bike Action—"Rock Shox on the Road to Roubaix", Aug. 1993, pp. 28-34 and 101, Aug. 1993.
"Rock Shox", Rock Shox—Basic SID rear shock dimensional drawings (2 pages).
"Rock Shox", Rock Shox—Shock SID Manuals.
"Sospensioni", Sospensioni—article in Italian, 1993, (p. 27).
Chipps, "Profile", Various Articles: Maverick American. Maverick American—Paul Turner, profile (7 pages), Spring 2004.

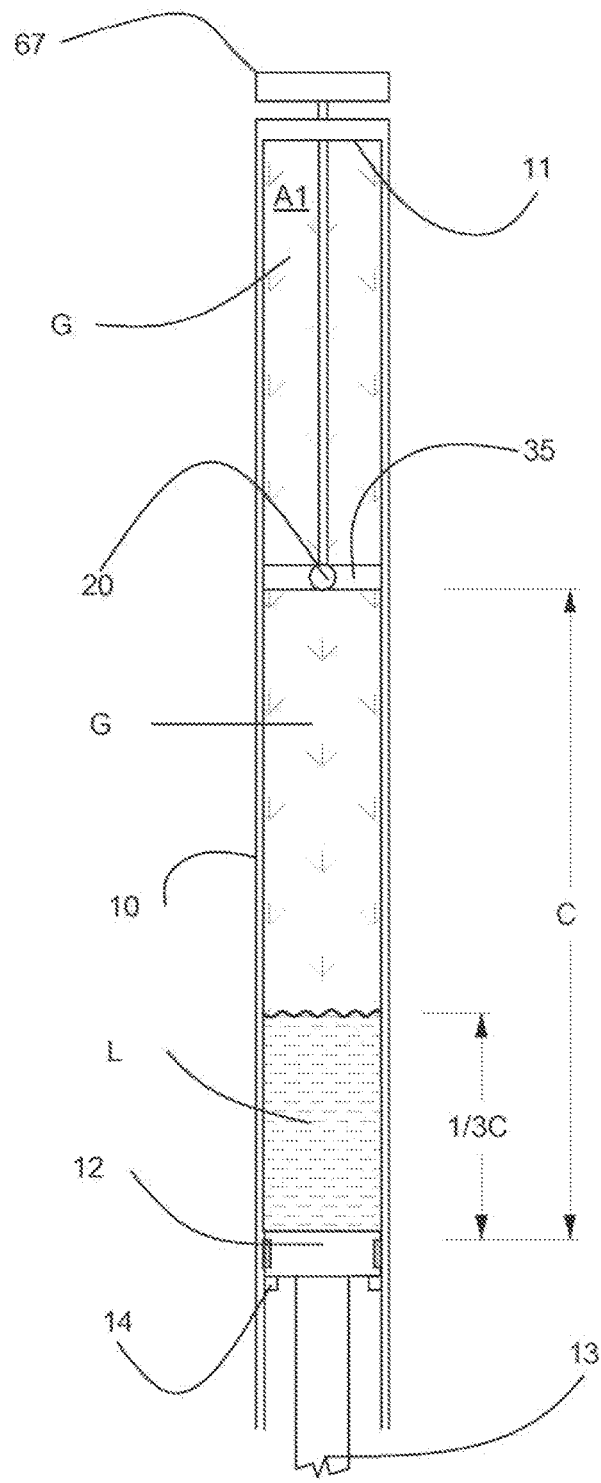

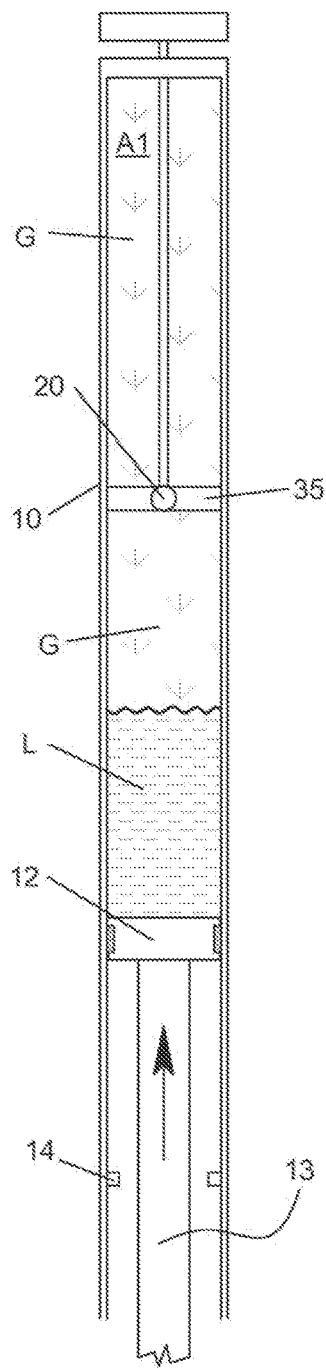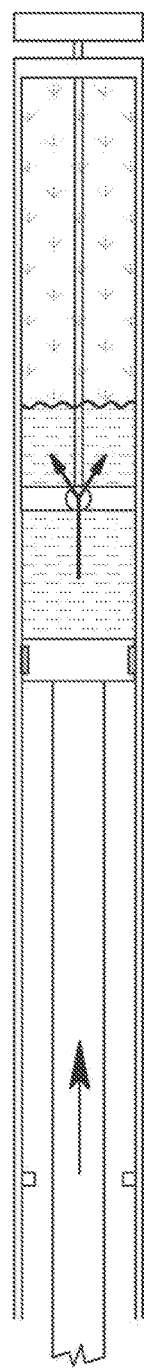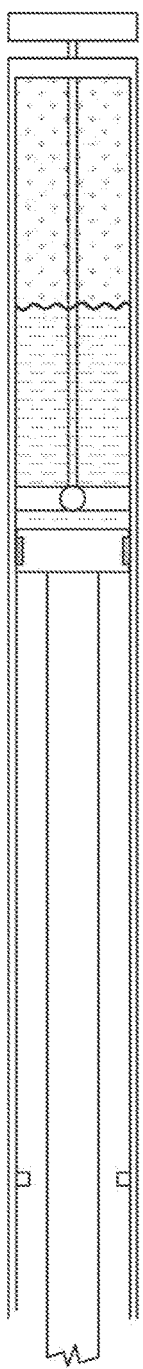

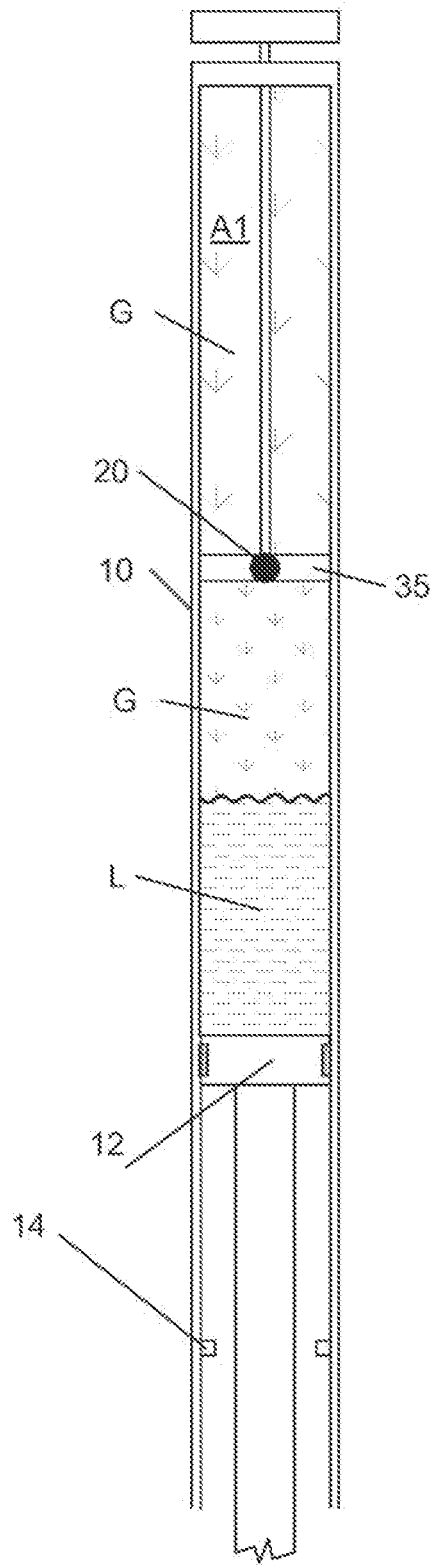
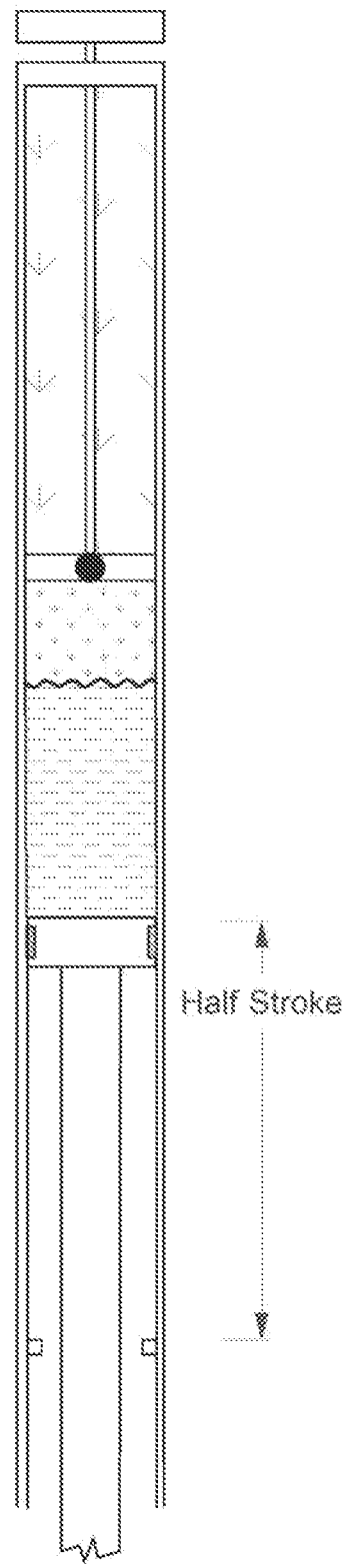
FIG 3A
(Short Travel)
FIG 3B
(Short Travel)

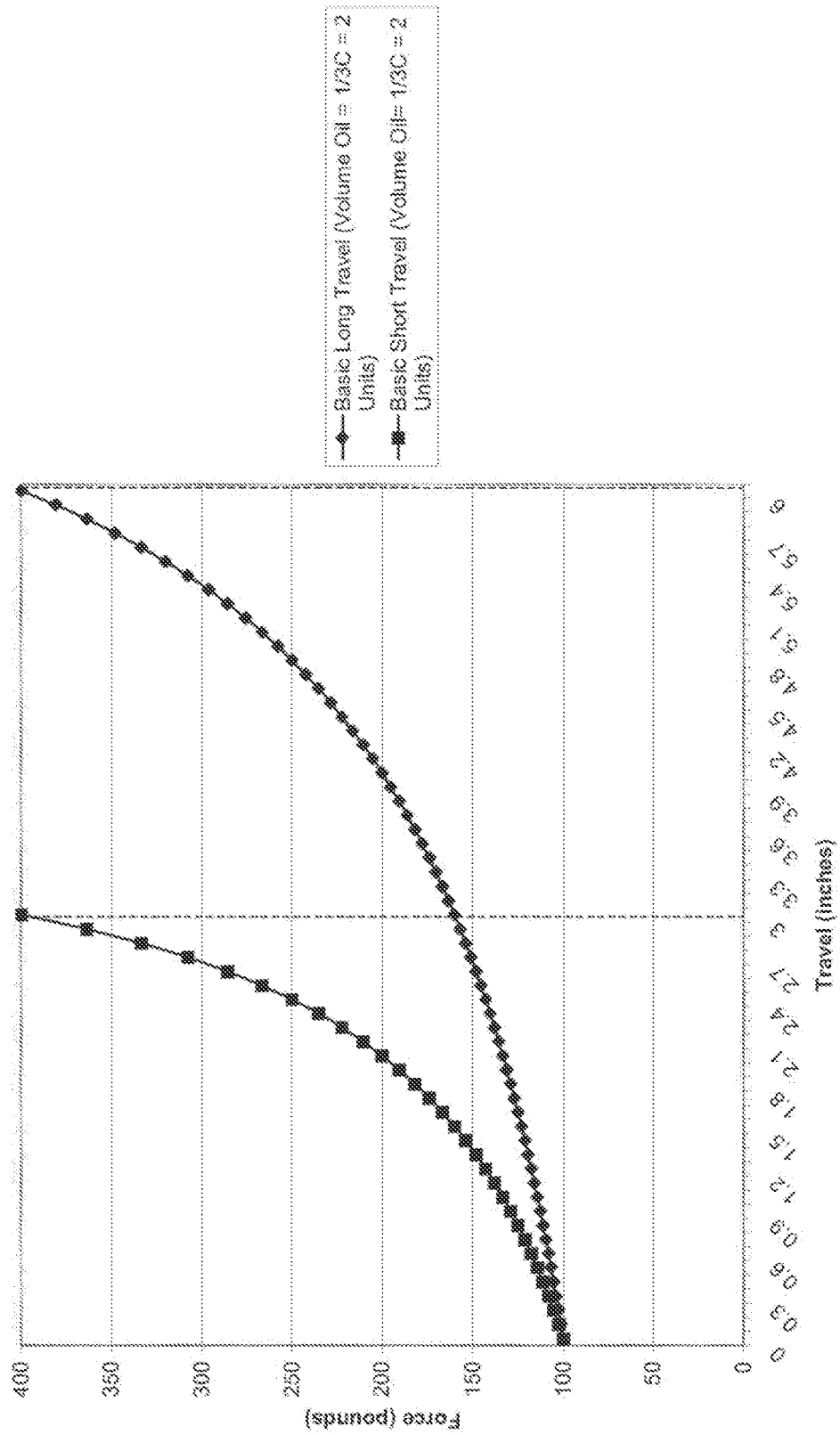

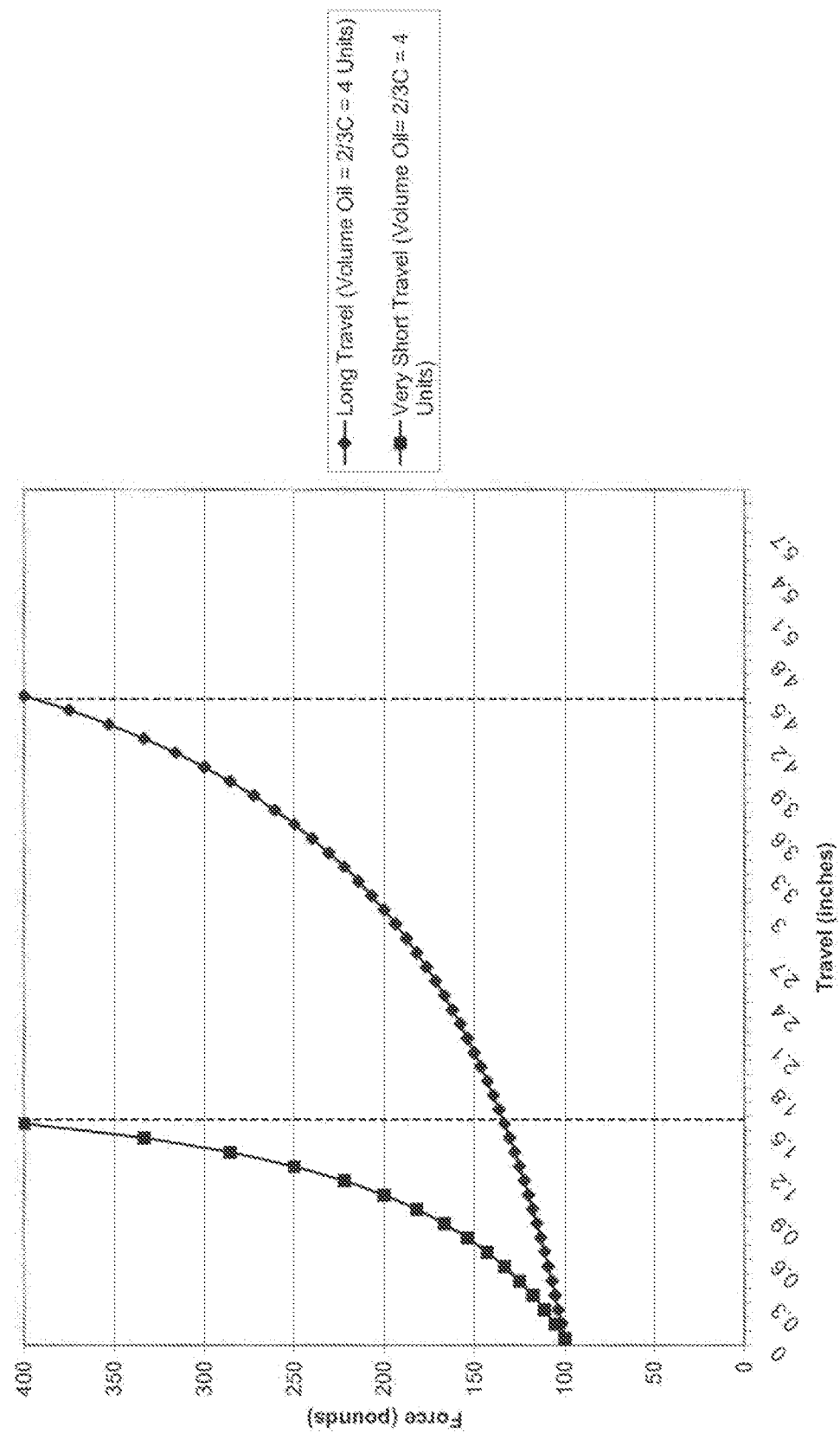

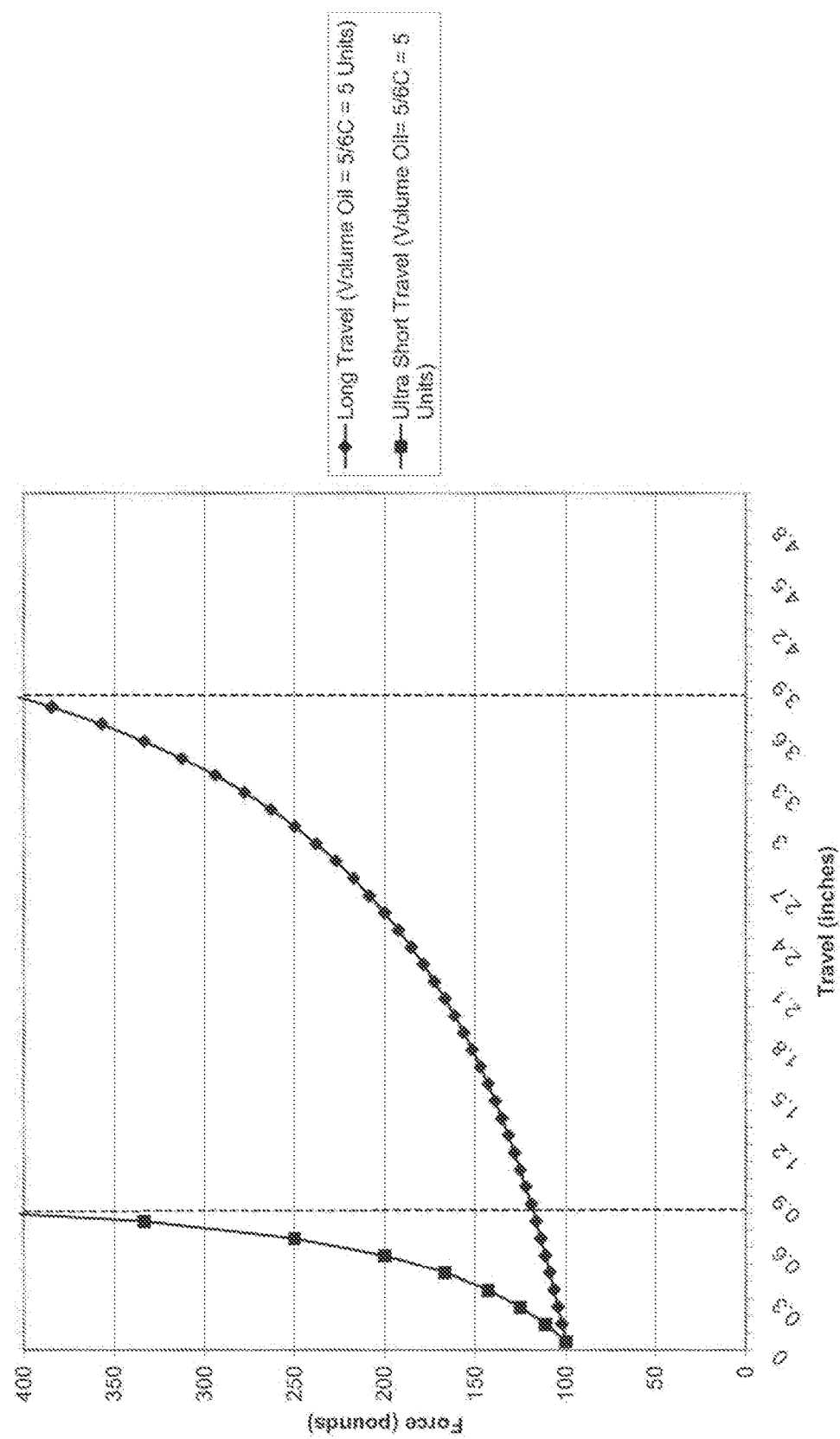

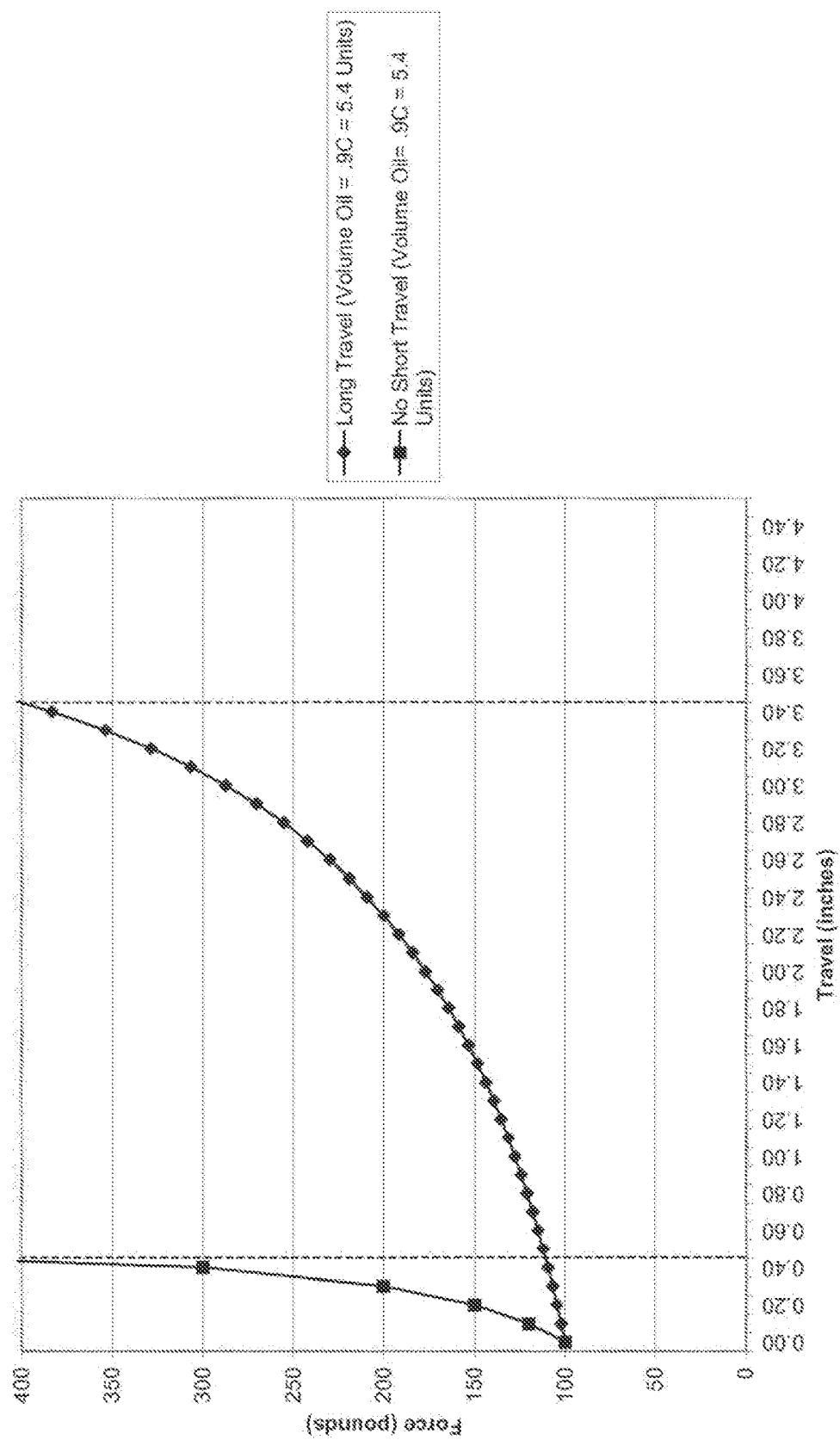

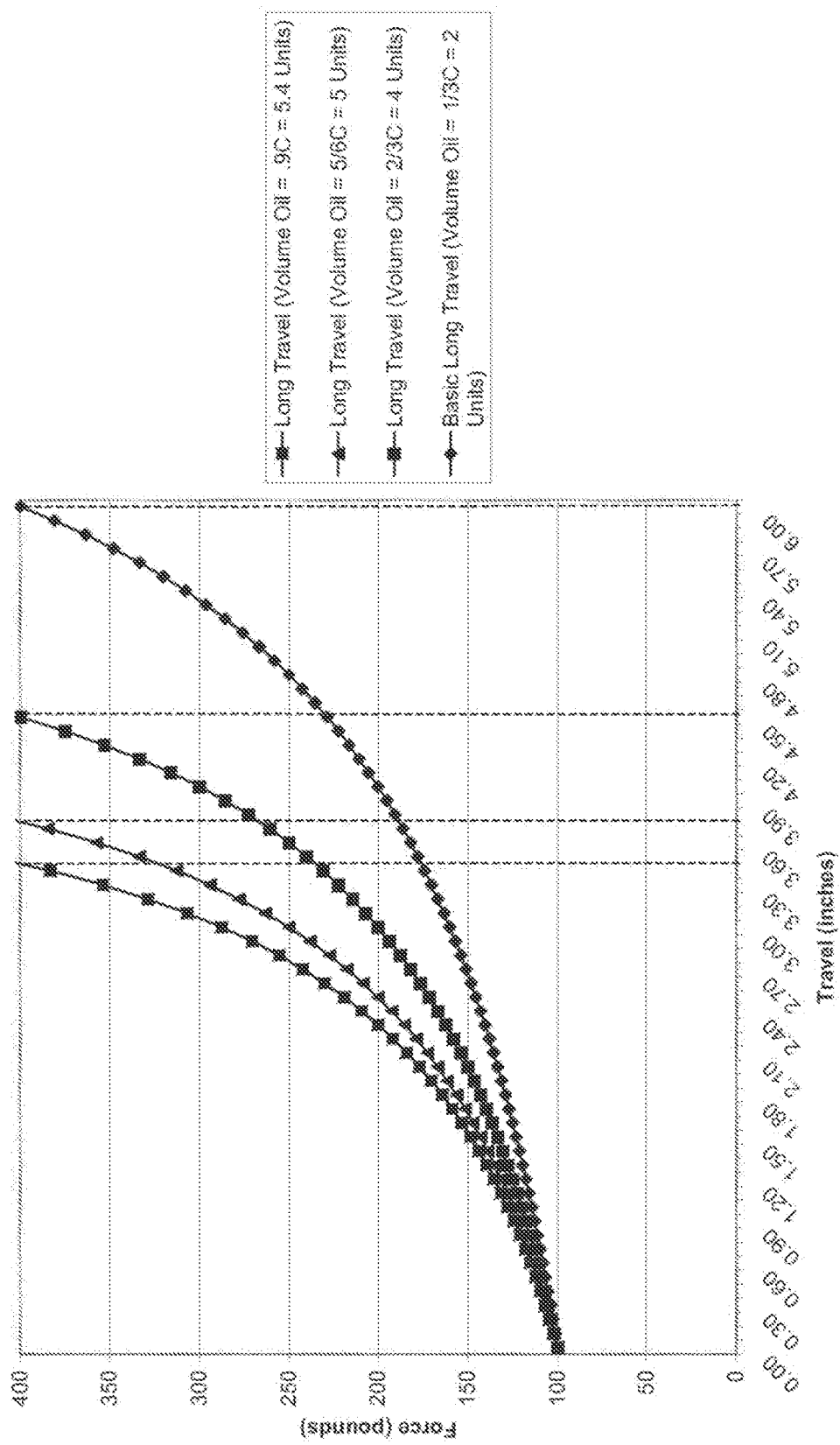

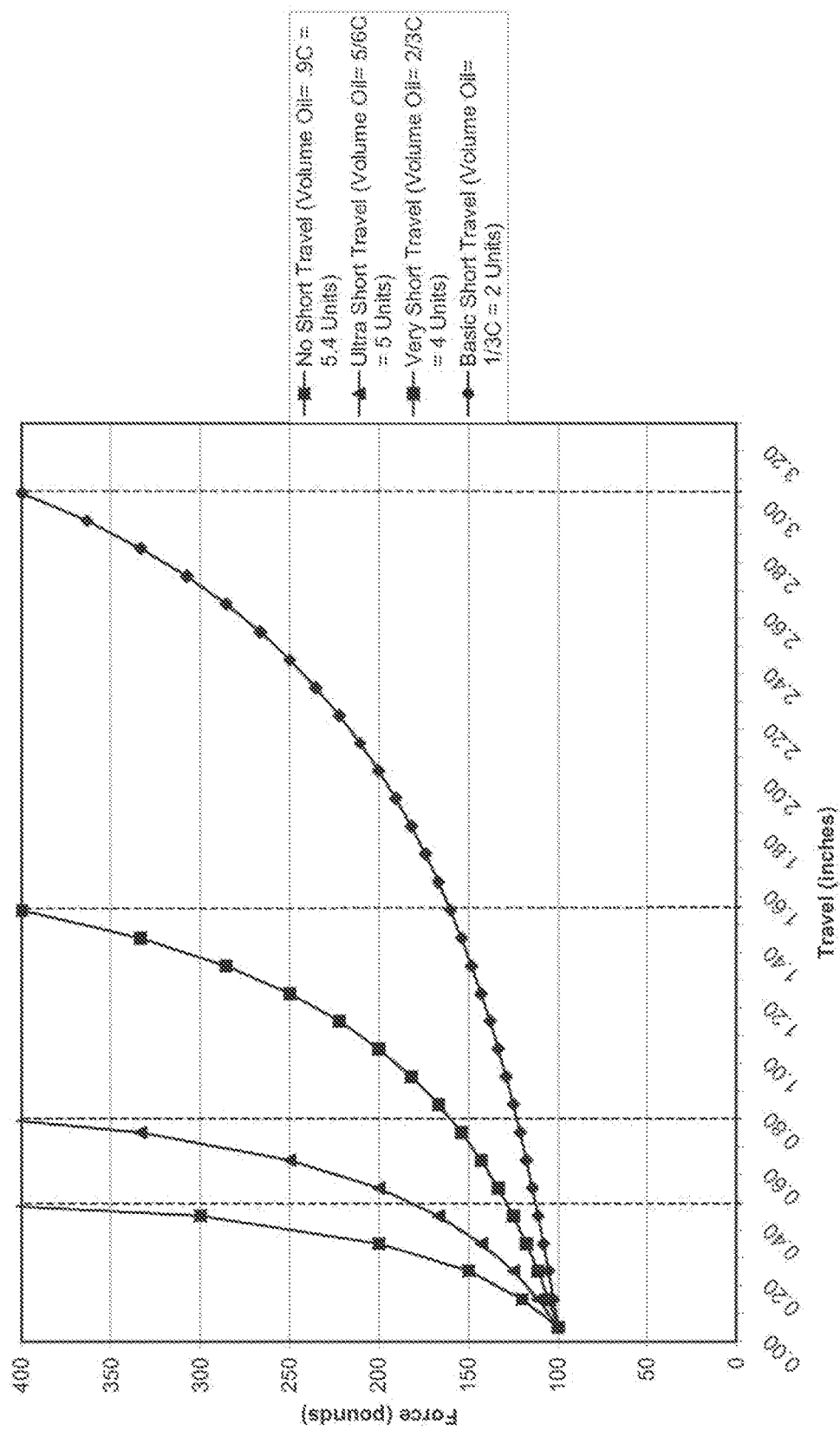

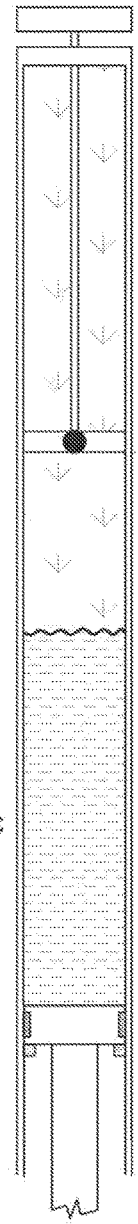
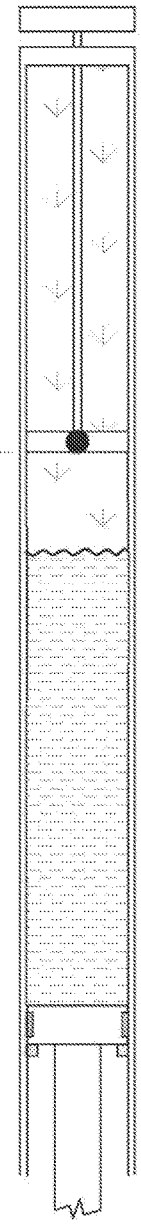
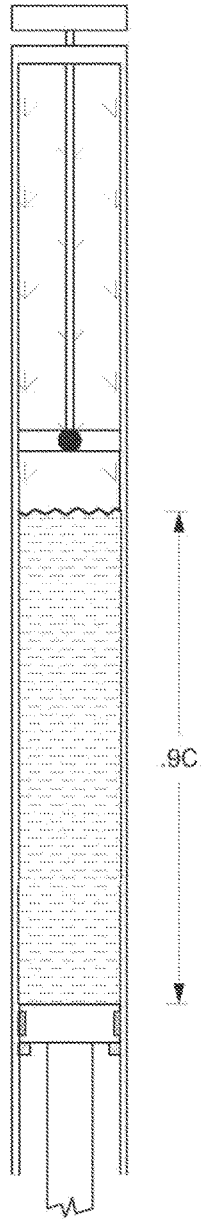
FIG 5A Basic Short
FIG 5B Very Short
FIG 5C Ultra Short
FIG 5D Substantially No Short Travel (Two Auxiliary Chambers)

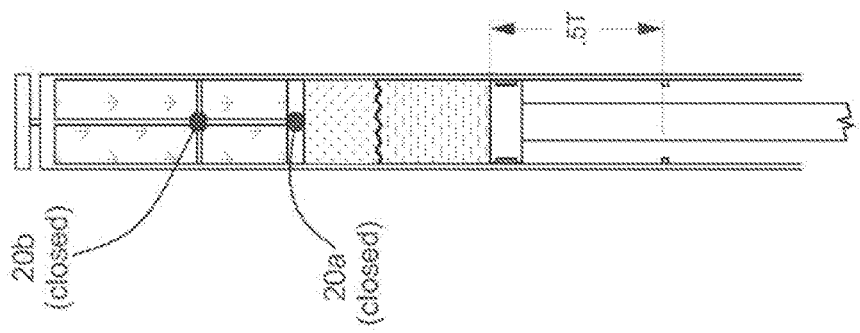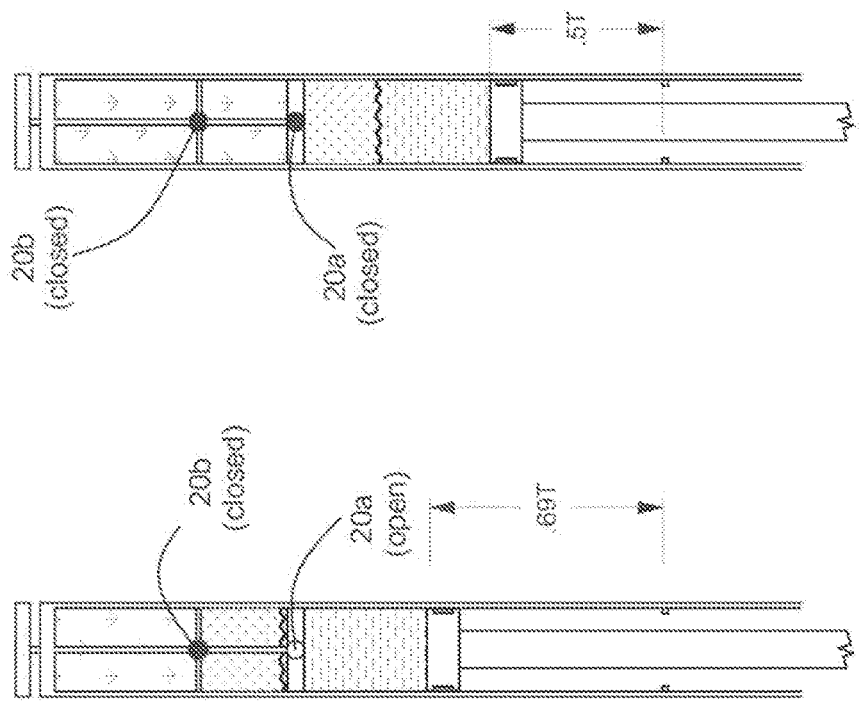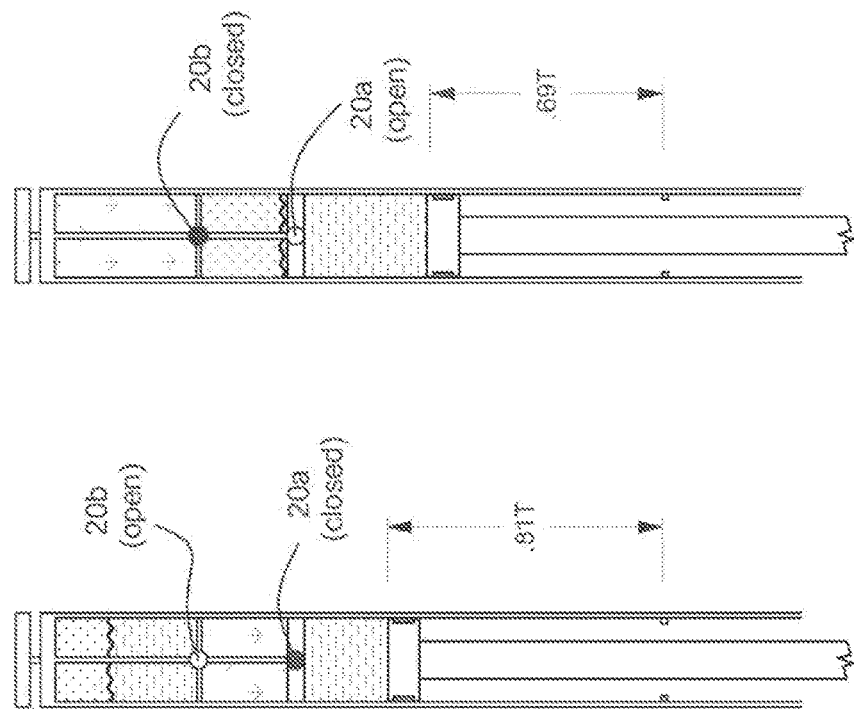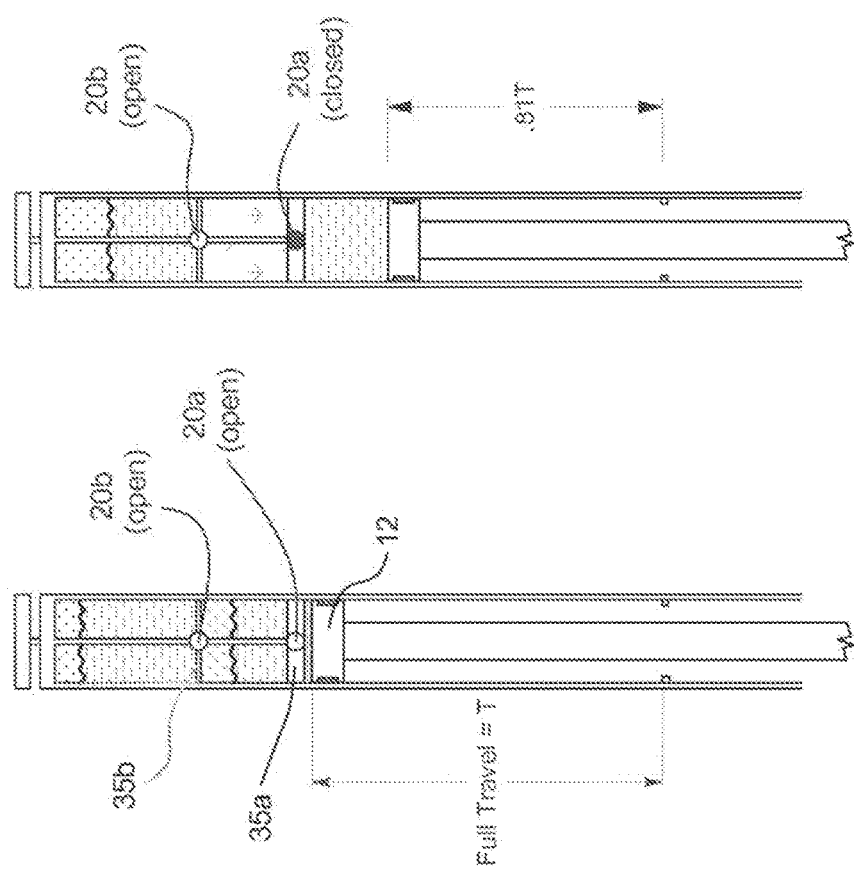

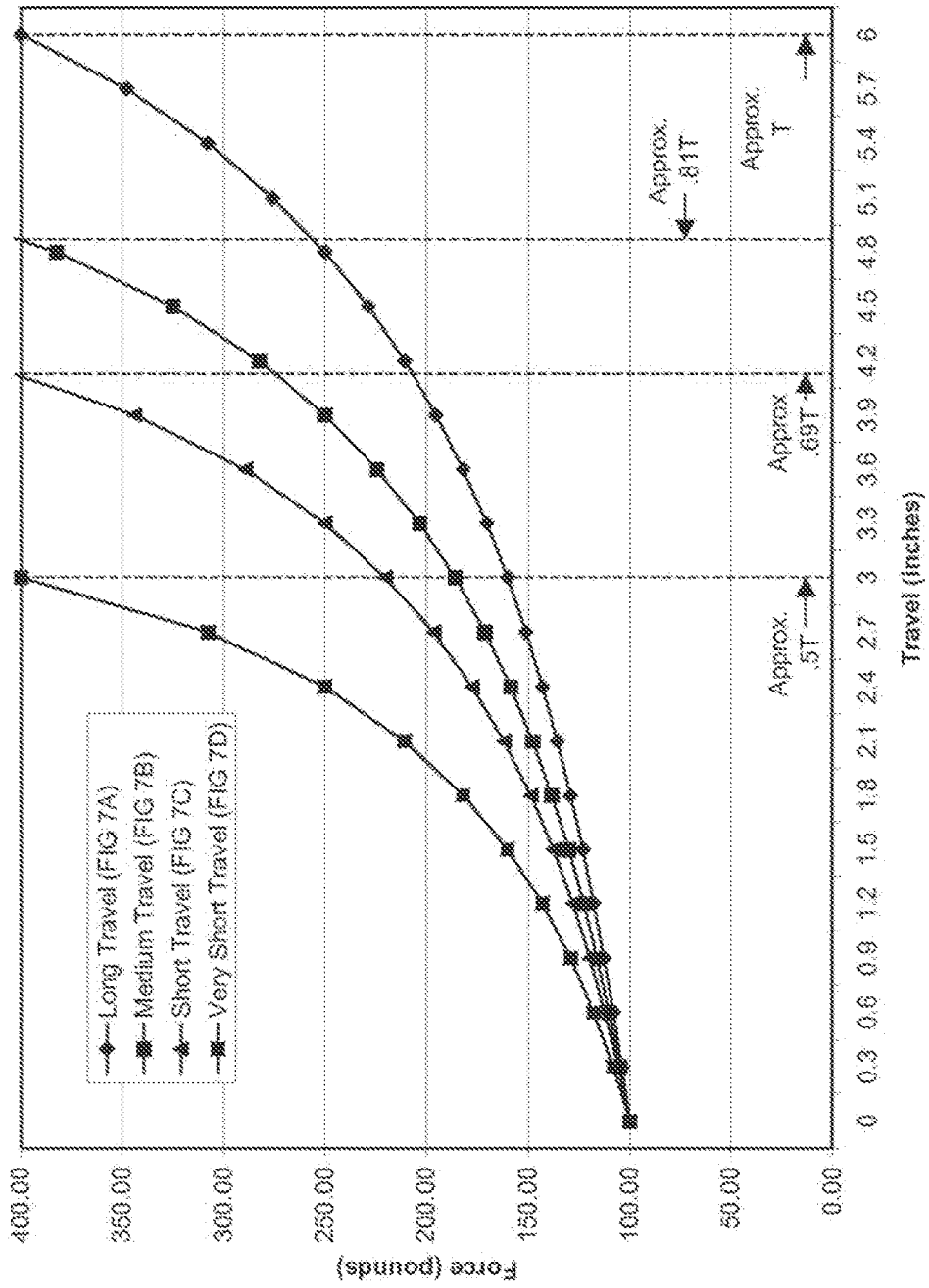

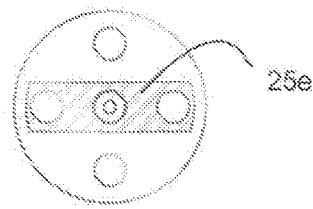
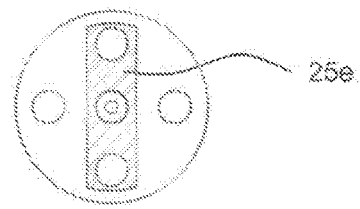
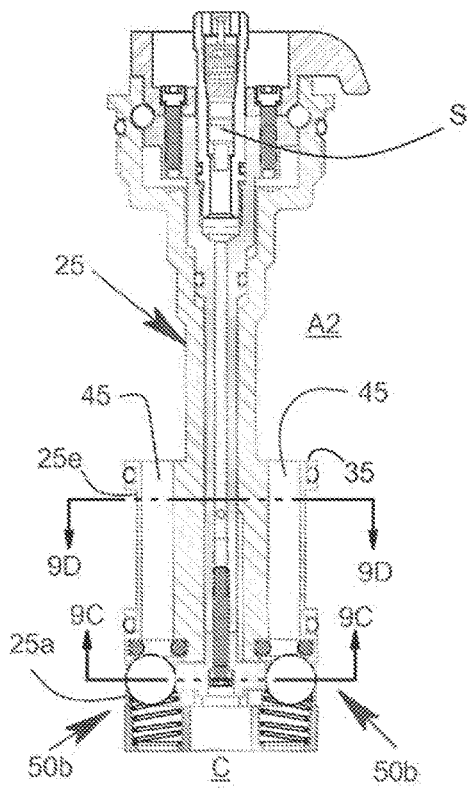
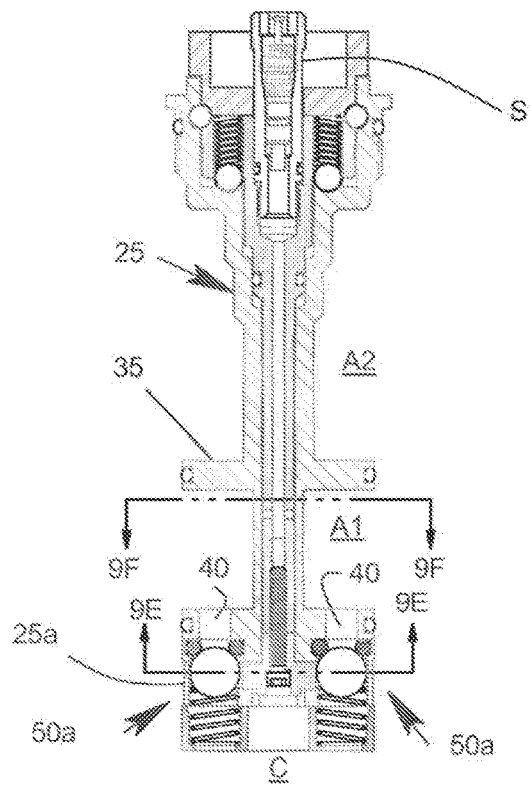
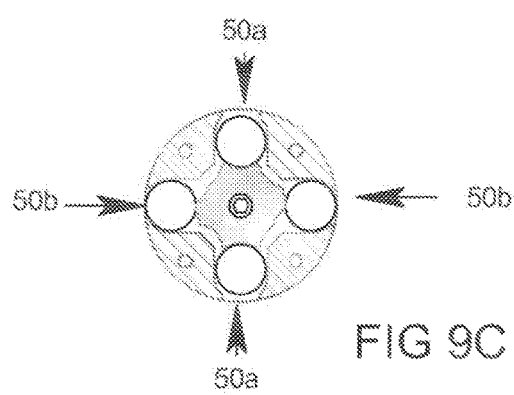
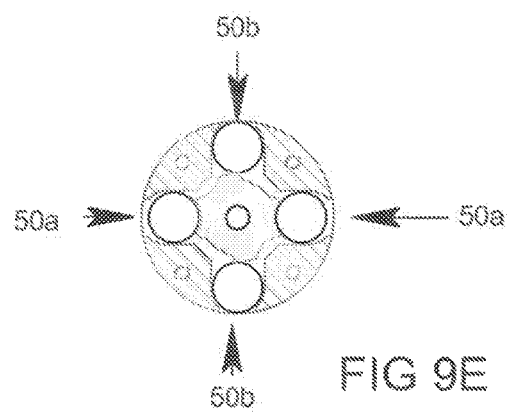

Long Travel

Medium Travel

Short Travel

Very Short Travel

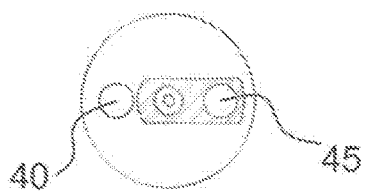
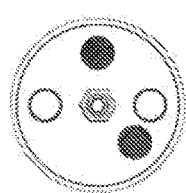
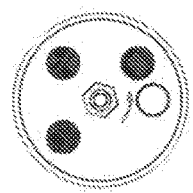
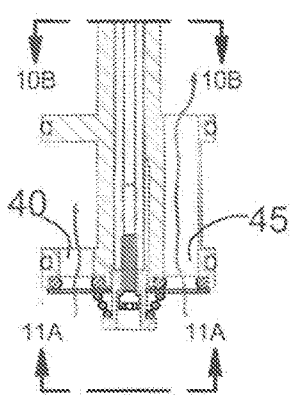
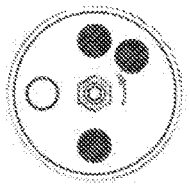
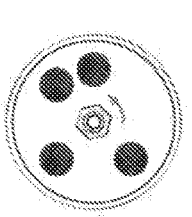
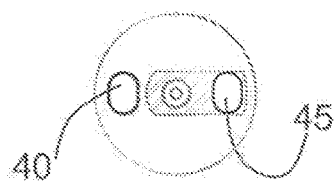
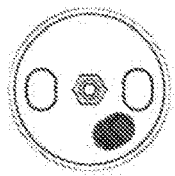
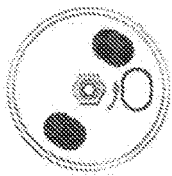
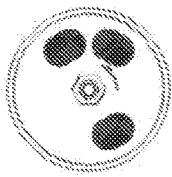

TRAVEL CONTROL FOR A GAS SPRING AND GAS SPRING HAVING VERY SHORT TRAVEL MODES

CROSS-REFERENCE TO RELATED APPLICATIONS

This application is a continuation application of and claims the benefit of co-pending U.S. patent application Ser. No. 14/086,649 filed on Nov. 21, 2013 entitled "TRAVEL CONTROL FOR A GAS SPRING AND GAS SPRING HAVING VERY SHORT TRAVEL MODES" By Robert C. Fox, which is incorporated herein, in its entirety, by reference.

The Ser. No. 14/086,649 application is a continuation application of and claims the benefit of U.S. patent application Ser. No. 13/164,065 and is now issued U.S. Pat. No. 8,608,141, filed on Jun. 20, 2011 entitled "TRAVEL CONTROL FOR A GAS SPRING AND GAS SPRING HAVING VERY SHORT TRAVEL MODES" by Robert C. Fox, which is incorporated herein, in its entirety, by reference, The Ser. No. 13/164,065 application is a continuation application of U.S. patent application Ser. No. 11/669,862 and is now issued U.S. Pat. No. 7,963,509, filed on Jan. 31, 2007 entitled "TRAVEL CONTROL FOR A GAS SPRING AND GAS SPRING HAVING VERY SHORT TRAVEL MODES" by Robert C. Fox, which is incorporated herein, in its entirety, by reference.

This application is related to our U.S. patent applications: a) Ser. No. 10/237,333, filed Sep. 5, 2005, published as U.S. Pub. 2003/0234144 (the "'144 application") on Dec. 25, 2003, and entitled "On the Fly Adjustable Gas Spring"; b) Ser. No. 11/372,707, filed Mar. 10, 2006, and entitled "Gas Spring and Travel Control For Same and Method"; and c) Ser. No. 11/560,403, filed Nov. 16, 2006, and entitled "Gas Spring Curve Control In An Adjustable-Volume Gas-Pressurized Device" (the "'403 application"). All patents and patent applications referred to herein are incorporated by reference into this patent application.

BACKGROUND OF THE INVENTION

Field of the Invention

The current invention is generally directed to improvements useful in gas-spring devices employed in, for example, two-wheeled vehicle suspension elements such as: shock absorbers, suspension forks and other variable-volume gas-pressurized devices ("gas springs").

Description of the Related Art

As described in detail in the '144 application and summarized in the '403 application, the stiffness (force-versus-travel or, as used herein, "spring curve") of a gas spring may be associated with "travel modes" (e.g. long and short). For example, as depicted in the two spring curves of FIG. 15 of the '144 application and described in para [0008] of the '144 application, travel modes are indicative of how far a spring compresses when subjected to a given compression force (i.e., a gas spring will compress more in long travel mode than in short travel mode). For example, for the gas spring described in the '144 application, in the long travel mode (FIG. 13), the amount of travel produced by a 750 pound force is approximately 1.75". In the short travel mode (FIG. 14), the amount of travel produced by the same force is approximately 1.27". Note that for the reasons described in para [0063] of the '144 application, all pressure values are dose approximations and effected by the presence of the negative gas spring.

In the '144 application, selection between the long and short travel modes is easily accomplished on the fly by a rider making a small (e.g. ¼) turn of an adjustment knob and without all the disadvantages of prior art methods for changing travel length (see discussion of prior art in the '403 application). In the '144 application there are two gas chambers. The long travel mode is operative when the two gas chambers are in fluid communication with each other. The short travel mode is operative when the two gas chambers are not in fluid communication with each other.

Although the gas spring as shown in the '144 application is capable of producing two available travel modes, it is often desirable to have more than two available travel modes—as described in the '403 application. Furthermore, it may often be desirable for the short travel mode to produce a substantially shorter travel length than has been so far provided such that for a given force, the distance between the travel limits of the long and short travel modes are spaced further apart, e.g., approximately 50% or more, or in other words, the travel in the short travel mode is approximately 50% or less of the travel in the long travel mode.

Finally, in general, by providing a rider with the ability to control suspension travel, riders have a tool for controlling the stiffness of the gas spring and the magnitude of the force that would cause a harsh bottom-out and uncomfortable metal-to-metal contact. Furthermore, by providing rider with a wide range of travel mode options, the suspension can, for example, be optimized for: (a) more consistent tire contact patch (lower gas spring stiffness); (b) more comfortable ride (lower gas spring stiffness); (c) increased pedal efficiency (reduced pedal bob) (stiffer gas spring); and (d) reduced fore-aft pitching (stiffer gas spring).

Therefore, there is room for improvement within the art.

SUMMARY OF THE INVENTION

In one embodiment, a gas spring for a two-wheeled vehicle includes: a main chamber and at least one auxiliary chamber; a control valve for controlling whether the main chamber and the at least one auxiliary chamber are in fluid communication with each other; a volume of liquid filling a portion of the main chamber at full expansion; pressurized gas filling the at least one auxiliary chamber and the remaining portion of the main chamber; and a movable piston for compressing the gas in the main chamber and displacing the liquid during a compression stroke of the gas spring.

BRIEF DESCRIPTION OF THE DRAWINGS

Due to the extensive use of schematic drawings herein, reference numerals have not always been repeated from FIG to FIG when not necessary to an understanding of the FIG or the invention. Furthermore, throughout the FIGs, cross-hatching density is used to symbolically represent relative gas pressures (see FIG. 1A). Therefore, an area containing less dense cross-hatching has a lower gas pressure than an area having denser cross-hatching. Generally, cross-hatching of structural components has been minimized to minimize confusion with symbolized "pressure cross-hatching".

Additionally: a) as in the '403 application, filled circles represent closed valves and empty circles represent open valves; and b) where possible, reference numerals from the '403 application have been used herein.

FIG. 1A depicts the relationships between representative exemplary pressures and their corresponding cross-hatching density.

FIG. 1B schematically depicts the gas spring of the '144 application modified according to a first exemplary embodiment of the current invention and at full expansion.

FIGS. 2A-2C schematically depict the operation of the modified gas spring of FIG. 1B at different positions in the stroke, when in long travel mode.

FIGS. 3A-3B schematically depict the operation of the modified gas spring of FIG. 1B at different positions in the stroke, when in short travel mode.

FIG. 4A depicts the long travel and short travel spring curves produced by the modified gas spring of FIG. 1B in a manner similar to the spring curves depicted in FIG. 15 of the '144 application.

FIGS. 4B, 4C, 4D depict the different long and short travel spring curve combinations that may be produced by the modified gas spring of FIG. 1B when the amount of liquid in the gas spring is varied.

FIG. 4E compares the different long travel spring curves that may be produced by the modified gas spring of FIG. 1B when the amount of liquid in the gas spring is varied.

FIG. 4F compares the different short travel spring curves that may be produced by the modified gas spring of FIG. 1B when the amount of liquid in the gas spring is varied.

FIGS. 5A-5D depict how the amount of liquid within the gas spring can be changed to alter the short travel mode (all shown at full expansion).

FIGS. 7A-D depict the gas spring of FIG. 6 in each of the four travel modes, respectively, and at their respective travel positions when subjected to the same maximum pressure.

FIG. 8 is a graph depicting the spring curves produced in each of the four travel mode settings of FIGS. 7A-D.

FIGS. 9A-F are different views of an exemplary physical embodiment of a gas spring control valve according to the invention, as modified from an exemplary embodiment of the '403 application.

FIGS. 11A-B depict another exemplary physical embodiment of a gas spring control valve according to the invention.

FIGS. 12A-D depict the gas spring control valve of FIGS. 11A-B in its various operative settings.

FIG. 13 depicts another exemplary physical embodiment of a gas spring control valve according to the invention.

FIGS. 14A-C depict the modified gas spring control valve of FIG. 13 in its various operative settings.

DETAILED DESCRIPTION

Figure 6:
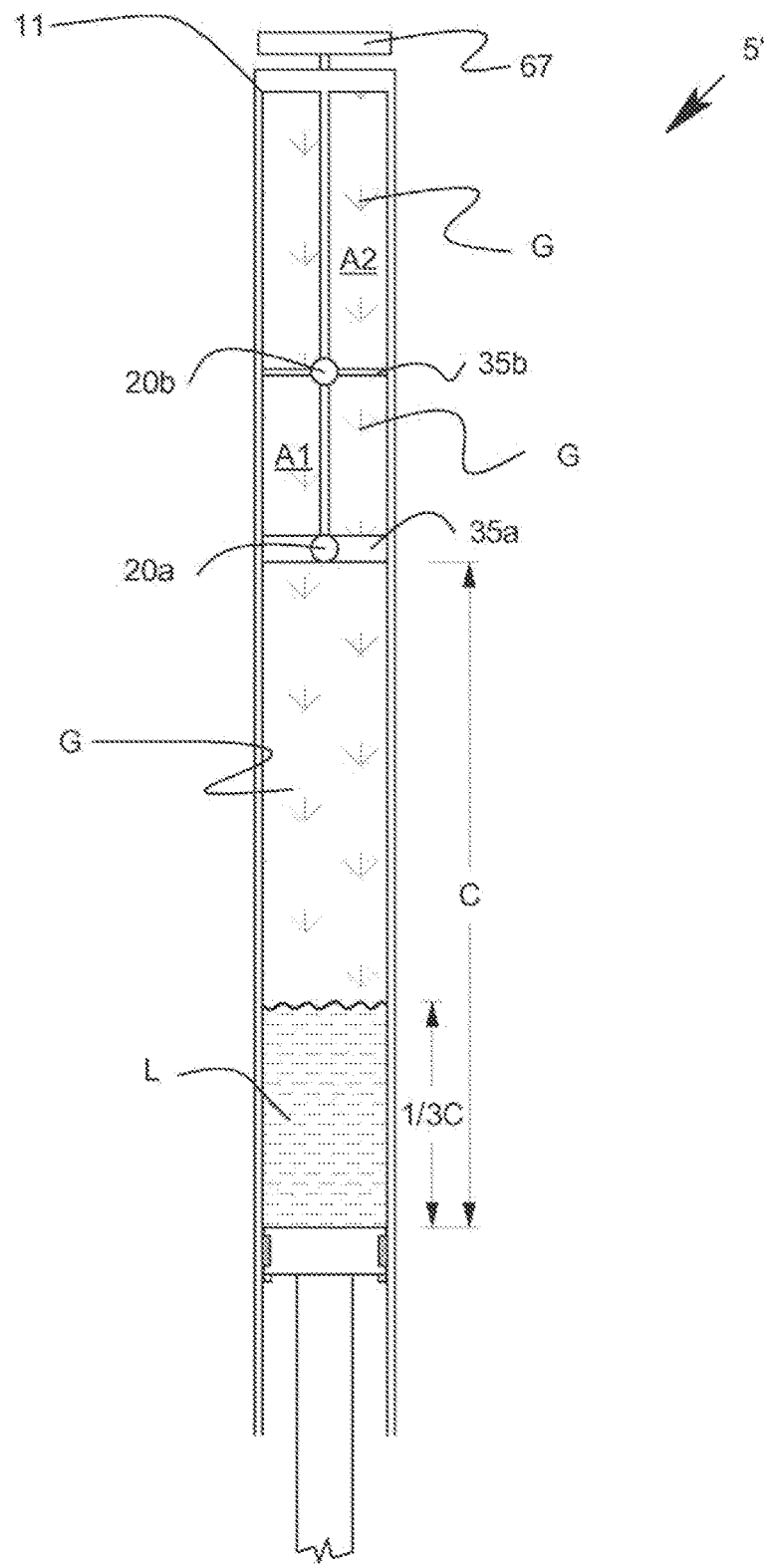
FIG. 6 schematically depicts an alternative exemplary embodiment of a modified gas spring according to the invention, at full extension, and having two auxiliary chambers.
Figure 10A:
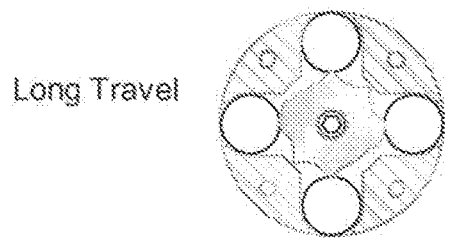
FIGS. 10A-D depict the gas spring control valve of FIGS. 9A-F in its various operative settings.
Figure 10B:
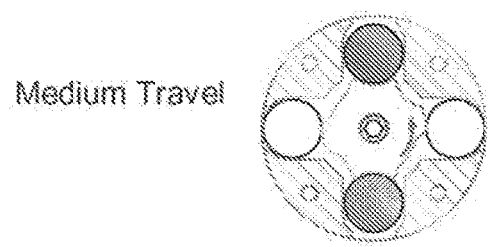
Figure 10C:
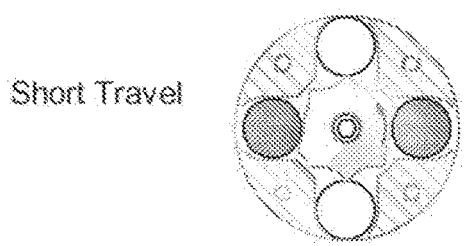
Figure 10D:
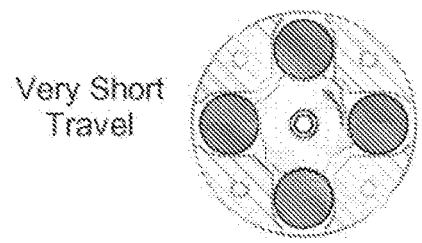

Basic Structure of an Exemplary Embodiment of the Invention

FIG. 1B schematically depicts the gas spring of the '144 application modified according to an exemplary embodiment of the current invention, at full extension, and without a negative gas spring. While in many instances it may be advantageous to have a negative gas spring and one skilled in the art would be aware that a negative air spring can be used with the exemplary embodiments of the present invention, for purposes of simplifying the bulk of the current discussion and its associated calculations, the negative gas spring and its associated effects have been omitted. However, FIG. 15 (discussed later) depicts a basic partial schematic layout of an exemplary embodiment of the invention including an exemplary negative gas spring. As schematically shown in FIG. 1B, gas spring 5 includes a gas spring housing 10 enclosing a main chamber C and one auxiliary chamber A1. Main chamber C is defined as the volume between partition 35 and piston 12 at full expansion. Auxiliary chamber A1 is defined as the volume between partition 35 and the upper end 11 of gas spring housing 10. Thus, the two chambers may be separated from each other by partition 35, which itself may have a valve 20. Valve 20 allows the user to selectively place the two chambers in fluid communication using a controller, such as a knob 67 positioned externally of the gas spring housing 10 and preferably within the easy reach of a mounted rider for easy on-the-fly manipulation. Gas spring housing 10 may be a portion of a suspension element, such as a shock absorber, suspension fork leg, or other damper. Furthermore, when the piston 12 is fully retracted, a volume of liquid L, such as oil or any other fluid that will not degrade internal seals, etc., is added to partially fill main chamber C. Liquid L sits on piston 12, which itself is supported by piston shaft 13. For the purposes of the upcoming basic exemplary embodiment of the invention, it is assumed that the volume of liquid L fills approximately ⅓ the volume of main chamber C. Liquid L may be added during manufacture of the gas spring 5 and subject to routine maintenance only, or to change the travel mode travel limits as will be described below-need not be bothered with by the rider. This is different from, for example, related art damper designs, such as extensively discussed in the '403 application, which require the user to change the liquid level or the position of an internal component each time the rider wants to change the gas spring curve. Finally, gas spring 5 is sealed and pressurized through a conventional pressurization valve S (see FIGS. 9A-9B) with a gas G (see description of pressurization in the '403 application) such that the gas pressures in main chamber C and auxiliary chamber A1 are equal.

Schematic Depiction of Long Travel Mode Operation

FIG. 2A-2C depict the modified gas spring according to this first exemplary embodiment of the invention and operating in long travel mode.

First, as described in the '144 and '403 applications, in the long travel mode, valve 20 is placed in its open position so that main chamber C and auxiliary chamber A1 are in fluid communication with each other. As previously mentioned, the gas pressures in main chamber C and auxiliary chamber A1 are equal.

In FIG. 2A, the gas spring 5 has begun to compress through its travel (note distance between piston 12 and piston stops 14). The liquid L is carried by the inwardly moving piston 12 and as the volume of gas G in the communicating main chamber C and auxiliary chamber A1 decreases, the gas pressure within communicating gas chambers C and A1 increases.

In FIG. 2B, the spring has compressed through its travel to a point where the volume between the piston 12 and partition 35 was no longer able to contain the full volume of liquid L. Therefore, a portion of the liquid L passed through open valve 20 and into auxiliary chamber A1. At this point, all the gas that was previously between the piston 12 and partition 35 has been displaced into auxiliary chamber A1 and the pressure of the gas has further increased as symbolized by the denser cross-hatching of FIG. 2B.

Finally, if gas spring 5 is constructed according to the parameters of TABLE ONE, as shown in FIG. 2C, the volume between the piston 12 and partition 35 will decrease to substantially zero (size exaggerated for clarity and to symbolize the lack of metal-to-metal contact) and all the gas and substantially all the liquid that were between the piston 12 and partition 35 will be in auxiliary chamber A1 (accordingly, the volume of the auxiliary chamber should be equal to or greater than the volume of the liquid to allow full travel in long travel mode). The pressure of the gas, of course, has increased as symbolized by the denser cross-hatching of FIG. 2C relative to FIGS. 2A and 2B.

Schematic Depiction of Short Travel Mode Operation

FIGS. 3A and 3B are discussed next. Note that in these figures—in contrast to FIGS. 2A-C—valve 20 is in its closed position (expressed again by filled in circles). With valve 20 closed, the gas spring 5 is in the short travel mode because main chamber C and auxiliary chamber A1 are not in fluid communication with each other.

As shown in FIG. 3A, the gas spring 5 has begun to compress through its travel (note distance between piston 12 and piston stops 14). The liquid L is carried by the inwardly moving piston 12 and as the volume of the gas between the piston 12 and partition 35 decreases, the pressure of the gas G between the piston 12 and partition 35 increases. However, because valve 20 is closed, the gas pressure in auxiliary chamber A1 remains constant and is irrelevant to this mode of operation. Thus, the hatching of the gas G between the piston 12 and partition 35 is denser than the hatching of the gas in auxiliary chamber A1.

FIG. 3B depicts how, at some point during the compression stroke, the increased pressure of gas G between the piston 12 and partition 35 will reach a value that precludes substantially any additional compression. As described below and generally depicted by FIG. 3B, the gas spring 5 may be designed so that the point at which substantially no additional compression occurs can be approximately 50% of full travel.

Graphical Depiction of Short and Long Travel Operation

The spring curves of FIG. 4A illustrate the spring curves produced by the gas spring 5 of FIG. 1B in each of its two different selectable modes: the short-travel mode and the long-travel mode. The spring curves of FIG. 4A result from the following initial gas spring conditions:

TABLE ONE

Initial Gas Spring Conditions (piston at full expansion)
Volume of main chamber C = 6 units.
Volume of auxiliary chamber A1 = 4 units.
Volume of liquid in the main chamber ≈ ⅓ volume of the main chamber (i.e. 2 units).
Therefore, at full extension, liquid and gas fill the main chamber.
Maximum Available Stroke = 6 units.
Piston area = 1 square unit.
Initial Internal Gas Pressure = 100 PSI NOTE:
One skilled in the art would recognize that units should come from a single consistent system of measurement.

As depicted by the long travel mode spring curve of FIG. 4A, the force produced by the gas spring as exemplified by FIGS. 2A-2C rises somewhat gradually and reaches, in this example, a value of 400 pounds at a stroke distance of about 6 inches (i.e., full travel) (FIG. 2B). As depicted by the short-travel mode spring curve of FIG. 4A, the force produced by the gas spring as exemplified by FIGS. 3A-3B rises more rapidly and reaches, in this example, a value of 400 pounds at a stroke distance of about 3 inches (i.e., half travel) (FIG. 3B).

As those skilled in the art will recognize, these exemplary force and stroke values are based on, for example, the parameters of TABLE ONE. However, as those skilled in the art will recognize, a theoretically infinite number of combinations of areas and pressures can produce the force values in this example.

Modified Short Travel Modes

FIGS. 4B, 4C, and 4D depicts the complementary long and short travel gas spring curves produced by the exemplary embodiments of FIGS. 5B-D, respectively, The complementary long and short travel gas spring curves produced by the exemplary embodiment of FIG. 5A is shown in FIG. 4A. In a two travel mode gas spring, such as described with references to FIGS. 1B, 2A-2C, 3A-3B and 5A-5D, the gas spring 5 would be provided with one valve setting for long travel and one valve setting for one of, for example, "basic" short, "ultra-short" or "very-short", or "substantially no short" travel.

Alternative short travel modes, such as very-short, ultra-short, and substantially no short travel may be easily produced by varying the amount of liquid L in the main chamber C as summarized in TABLE TWO, when all the other initial gas spring conditions described in TABLE ONE are kept constant:

TABLE TWO

| Short Travel Mode | FIG. | Volume of Oil at Full Expansion |
|---|---|---|
| Basic Short | 4A, 5A | ⅓ C (2 units) |
| Very Short | 4B, 5B | ⅔ C (4 units) |
| Ultra-Short | 4C, 5C | ⅚ C (5 units) |
| Substantially No Short Travel | 4D, 5D | .9 C (5.4 units) |

As can be seen in FIGS. 4E, 4F, increasing the volume of the liquid in main chamber C from ⅓ the fully expanded volume of main chamber C to 0.9 the volume of main chamber C causes the short and long travels of gas spring 5 to decrease significantly. As these travels decrease, the force produced by the gas spring 5 rises from rapidly (basic short travel) to extremely rapidly (substantially no-short travel).

Alternative Embodiment

While the '144 application and the previously described exemplary embodiment of the invention use one main and one auxiliary chamber to provide two travel settings, i.e., long and short travel modes, the '403 application uses one main and two auxiliary chambers to provide four discrete travel mode settings. The user may select from among the various available settings on-the-fly, for example, by manipulating a controller. According to the current invention, and using the teachings of the '403 application, four user selectable travel mode settings may also be provided in an alternative exemplary embodiment of the current invention. Therefore, for example, FIG. 6 depicts a schematic version of a fully expanded gas spring according to an exemplary alternative embodiment of the invention applying the teachings of the '403 application.

In particular, the gas spring is provided with a first auxiliary chamber A1 defined between partition 35*a* and partition 35*b* and a second auxiliary chamber defined between partition 35*b* and upper end 11 of the gas spring housing. Furthermore, auxiliary chambers A1, A2 may be selectively placed into fluid communication with main chamber C using controller 67 to adjust the settings of valves 20*a*, 20*b*. While in the '403 application, only gas is displaced among the various gas chambers when they are in fluid communication, according to this alternative exemplary embodiment of the invention, both gas and liquid may be displaced among the various gas chambers depending upon the settings of valves 20*a*, 20*b*. Note that as FIG. 6 is a schematic, valves 20*a*, 20*b*, may take any form and even be part of a single valve assembly (see e.g. FIG. 11A-B, 12A-D, 13, 14A-C, where a single rotary disk valve is shown).

FIG. 7A-D schematically depict the operation of the gas spring according to this alternative exemplary alternative embodiment of the invention: a) with the design parameters described in TABLE THREE, below; b) in each of its four travel mode settings, respectively, as will be described below; and c) at the point in the travel of piston 12 where the pressure of the gas acting on the face of the piston 12 has increased to the same level (e.g. 400 psi) in each setting.

In particular:

Long travel mode—FIG. 7A)—Valves 20*a* and 20*b* are open and the inwardly moving piston 12 displaces all the liquid L and all the gas G that were in the main chamber C into the first and second auxiliary chambers A1, A2 to the point where the pressure of the gas increases to about 400 psi. In this exemplary embodiment, this occurs at, full travel (distance between piston 12 and partition 35 exaggerated for detail and to symbolize lack of metal-to-metal contact); and (Medium travel mode—FIG. 7B)—Valve 20*b* is open and valve 20*a* is dosed and the inwardly moving piston displaces all the gas G and some of the liquid L that were in the main chamber C into the second auxiliary chamber A2 until the pressure of the gas increases to about 400 psi; and Short travel mode—FIG. 7C)—Valve 20*a* is open and valve 20*b* is dosed and the inwardly moving piston displaces all the gas G and some of the liquid L that were in the main chamber C into the first auxiliary chamber A1 until the pressure of the gas increases to about 400 psi; and (Very short Travel mode—FIG. 7D) Valves 20*a* and 20*b* are dosed and the inwardly moving piston compresses the gas G in the main chamber C until the pressure of the gas G in the main chamber C increases to about 400 psi.

FIG. 8 depicts an exemplary family of gas curves that may correspond to the long, medium, short, and very short travel modes summarized immediately above. As can be seen in FIG. 8, as the setting of the gas spring 5 changes from long travel mode to very short travel mode, the travel produced by a given force decreases. The operation of this exemplary embodiment when subjected to a 400 pound force in each travel setting is summarized in TABLE THREE below.

TABLE THREE

| FIG. | Controller Setting | Travel Mode | Valve 20a | Valve 20b | Chambers Used | Exemplary Travel Position Resulting from a 400 pound force |
|---|---|---|---|---|---|---|
| 7A | 1 | Long | Open | Open | C, A1, A2 | T |
| 7B | 2 | Medium | Closed | Open | C, A2 | .81 T |
| 7C | 3 | Short | Open | Closed | C, A1 | .69 T |
| 7D | 4 | Very Short | Closed | Closed | C | .5 T |

Assumptions at Full Expansion:
Volume main chamber C = 6
Volume first auxiliary chamber A1 = 1.5
Volume second auxiliary chamber A2 = 2.5
Volume of liquid L = 2
Travel = T = 6 units
Initial Internal pressure = 100
PSI Piston Diameter = 1 square unit.
(see note re: units in TABLE TWO above)

Exemplary Physical Embodiment

FIGS. 9A-F depict various views of an exemplary physical embodiment of valving that may be used with the gas spring 5 previously schematically shown in FIG. 6 (i.e., having two auxiliary chambers). This exemplary physical embodiment is generally similar to the gas spring control valve described in the '403 application and therefore reference should be made to that application for detailed structural and operational descriptions.

The major differences between the current exemplary physical embodiment and that of FIGS. 2-10 of the '403 application concerns modifications needed to allow liquid to flow with minimal restriction through the various flow ports that were previously designed only to accommodate gas flow. In the '403 application, where only gas was used, flow ports 40, 45 had an exemplary diameter on the order of 0.050" when unrestricted gas flow between the various gas chambers was desired.

In the current invention, however, liquid and gas must be able to flow through the flow ports 40, 45 at a rate commensurate with potentially large stroke velocities.

To achieve these large liquid flow capabilities, the gas spring control valve of FIGS. 2-10 of the '403 application may be modified in any way that allows increased liquid flow rates.

For example, the cross-sections of flow ports 40, 45 may be significantly increased. By increasing, for example, the cross-section from 0.050" ('403 application) to 0.187" (current exemplary embodiment), flow area increases by a factor of about 14 times.

To accommodate these larger flow ports 40, 45, body portion 25 may need to be modified. For example, a body portion extension 25e may be provided between first end 25a of body portion 25 and partition 35. The width of extension 25e is only slightly larger than the flow port diameters. Additionally, to further contribute to reduced pressure drops while accommodating the larger fluid flows, instead of there being only one of each flow port 40, 45, according to an exemplary embodiment of the invention, there may two of each flow port. This allows greater flow volumes and lower pressure drops. Accordingly, there may be a pair of first ball valves 50a and a pair of second ball valves 50b (FIGS. 9C, 9E).

FIGS. 10A-D depict the operation of the control valve in a similar manner as described in the '403 application. In particular, the valve produces four different valve settings that may produce the four different travel modes, as described above and in the '403 application.

Alternative Exemplary Physical Embodiment

Figure 15:
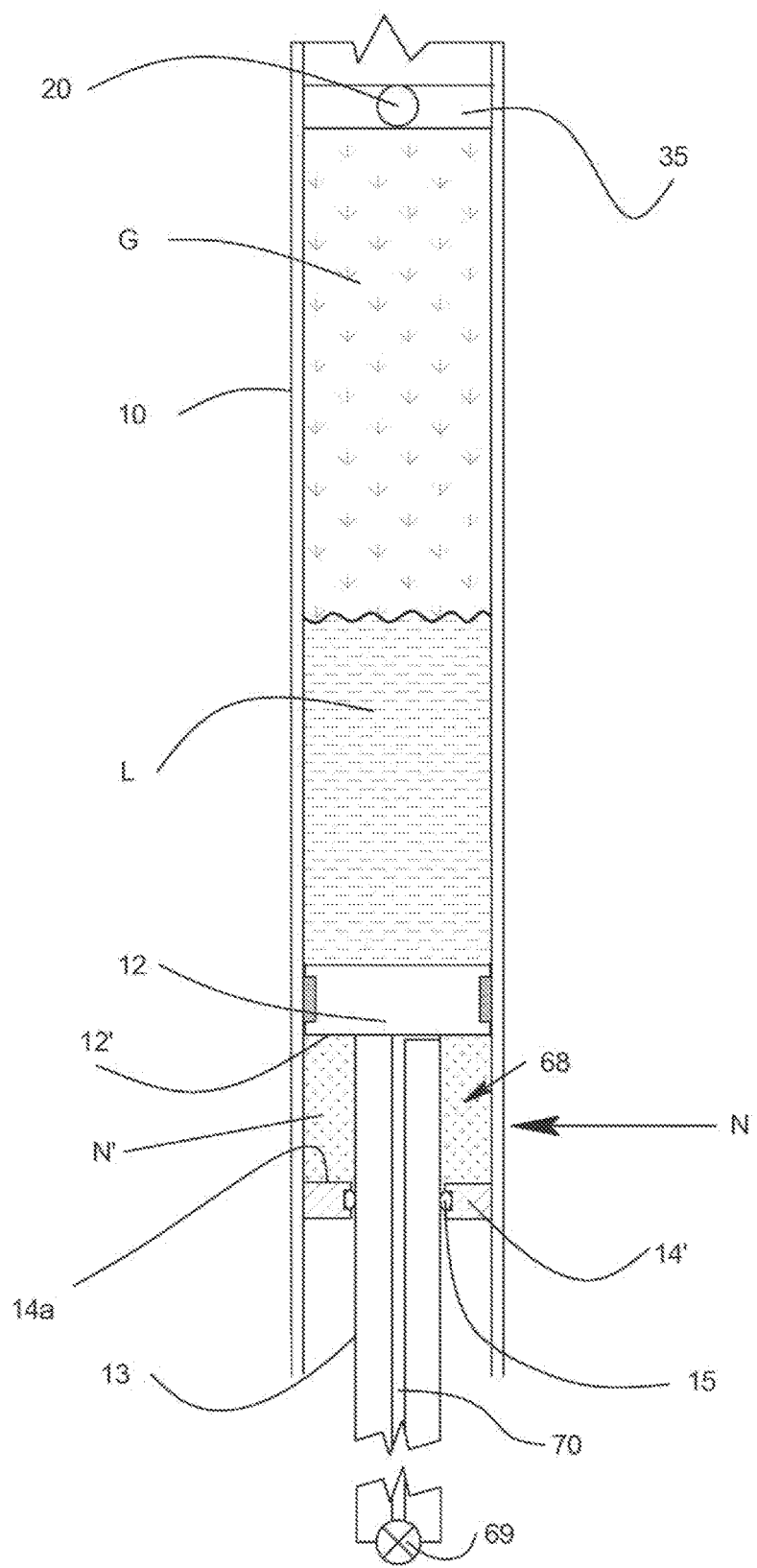
FIG. 15 depicts a basic partial schematic layout of an exemplary embodiment of the invention including an exemplary negative gas spring.

As shown in FIGS. 15-16 of the '403 application, gas spring curve control valve 20 may comprise a rotary disc valve rather than ball valves. Reference should be made to the '403 application for a complete description of the structure and operation of the rotary disc valve, As shown in FIGS. 11A-14C herein, the rotary disc valves of the '403 application may also be applied to the current invention and in different configurations.

For example, in FIGS. 11A-11B, herein, the structure of FIGS. 15-16 of the '403 application is shown—with the modification that the diameters of flow ports 40, 45 are made larger for the reasons previously described above. As in the '403 application, four different valve settings are provided that are 45 degrees apart (FIGS. 11A-D).

In FIG. 13, 14A-C, a compromise is made between the number of different valve settings and the capacity for liquid flow (i.e., liquid flow rate). Specifically, one of the four different valve settings and its associated travel mode are eliminated. As an example, the travel mode setting that may be removed could be the one where the main chamber and the first auxiliary (lower) chamber are in fluid communication. The elimination of the valve setting opens up additional angular space on body 25 so flow ports 40, 45 may be made oblong, or "kidney-shaped" (FIG. 13-14). The oblong flow ports 40, 45 provide for approximately 50% more flow rate than the related circular flow ports. Therefore, if a designer is designing a gas spring that may be regularly subjected to larger impacts, this embodiment of the present invention offers the design option of eliminating one of the travel settings in favor of oblong ports to accommodate larger fluid flows.

Negative Gas Spring

FIG. 15 depicts an exemplary embodiment of the invention including an exemplary negative gas spring N that biases the gas spring towards the compressed position. The negative gas spring may be applied to any of the previously described exemplary embodiments of the invention. The use of negative gas springs is generally described in, for example, U.S. Pat. No. 6,135,434 (Marking); U.S. Pat. No. 6,311,962 (Marking); U.S. Pat. No. 6,360,857 (Fox); and U.S. Pat. No. 6,105,988 (Turner).

According to the exemplary embodiment of FIG. 15, piston stop 14 may be made into an annular piston stop disk 14'. Piston rod 13 may freely translate through the bore in the annular piston disk 14', but the surface of the piston rod is sealed against the annular piston stop disk 14', such as by use of an o-ring 15. Finally, a pressurized gas N' may be inserted into the spring chamber 68 defined between piston bottom 12' and a top surface 14a of annular piston stop disk 14'. The gas may be inserted into spring chamber 68 using, for example, a conventional gas valve 69 (shown schematically) in combination with a gas port 70 in piston rod 13. One skilled in the art, using, for example, the teachings of the patents mentioned immediately above in combination with the exemplary pressures mentioned throughout the present application would then be able to determine the pressure of gas N' to tune the overall gas spring 5 to a desired performance.

CONCLUSION

While the invention has been described with respect to certain exemplary embodiments, the scope of the invention shall only be limited by the appended claims.

LIST OF REFERENCE NUMERALS USED

| | |
|---|---|
| 5, 5' | gas spring |
| 10 | gas spring housing |
| 11 | upper end of gas spring housing |
| 12 | piston |
| 12' | piston bottom |
| 13 | piston shaft |
| 14 | piston stop |
| 14' | annular piston stop disk |
| 14a | top of annular piston stop disk |
| 15 | seal |
| 20, 20a, 20b | control valve |
| 25 | body portion |
| 25a | first end of body portion |
| 25e | body portion extension |
| 35, 35a, 35b | partition |
| 40 | first flow port |
| 45 | second flow port |
| 50 | ball valve |
| 67 | knob |
| 68 | negative gas spring chamber |
| 69 | gas valve |
| 70 | gas port |
| A1, A2 | auxiliary chambers |
| C | main chamber |
| G | gas |
| L | liquid |
| N | negative gas spring |
| N' | negative gas spring gas |

The invention claimed is:

1. A gas spring for a vehicle, comprising:
a gas spring housing;
a main chamber and an auxiliary chamber, said gas spring housing enclosing said main chamber and said auxiliary chamber;
a single valve member having a first position in which it is bi-directionally open in a compression and rebound stroke and a second position in which it is bi-directionally closed in both the compression and rebound stroke, and when open, the single valve member allows fluid communication between the main chamber and said auxiliary chamber;
pressurized gas that fills said auxiliary chamber and a portion of the main chamber; and
a movable piston that compresses the gas in the main chamber and displaces a volume of liquid during a compression stroke of the gas spring; wherein when the single valve member is open during the compression stroke, substantially all the gas in the main chamber may be displaced into said auxiliary chamber.

2. A gas spring for a vehicle, comprising:
a gas spring housing;
a main chamber, said gas spring housing enclosing said main chamber;
an auxiliary chamber, said gas spring housing enclosing said auxiliary chamber;
a spring chamber;
a single valve member that allows fluid communication between the main chamber and said auxiliary chamber;
a controller constructed and arranged to position the single valve member in a bi-directional open position or bidirectional closed position in both a compression and rebound stroke;
a volume of liquid that fills a portion of the main chamber at full expansion;
pressurized gas that fills said auxiliary chamber, a remaining portion of the main chamber, and the spring chamber; and
a movable piston located in the spring chamber that compresses the gas in the main chamber and displaces the liquid during the compression stroke of the gas spring.

3. A gas spring for a vehicle, comprising:
a gas spring housing;
a main chamber and a plurality of auxiliary chambers, said gas spring housing enclosing said main chamber and said plurality of auxiliary chambers;
a control valve for controlling whether the main chamber and said plurality of auxiliary chambers are in fluid communication with each other;
a volume of liquid filling a portion of the main chamber at full expansion;
pressurized gas filling said plurality of auxiliary chambers and the remaining portion of the main chamber; and
a movable piston for compressing the gas in the main chamber and displacing the liquid during a compression stroke of the gas spring, wherein said plurality of auxiliary chambers includes a first auxiliary chamber and a differently sized second auxiliary chamber and the control valve includes a plurality of discrete settings for controlling whether different combinations of the main chamber, first auxiliary chamber and second auxiliary chamber are in fluid communication with each other.

4. A gas spring for a vehicle, comprising:
a gas spring housing;
a main chamber, said gas spring housing enclosing said main chamber;
at least one auxiliary chamber, said gas spring housing enclosing said at least one chamber, wherein said main chamber is fillable with a volume of liquid, and wherein said at least one auxiliary chamber comprises:
a first auxiliary chamber and a second auxiliary chamber;
a first flow port disposed between said main chamber and said first auxiliary chamber, said first flow port enabling a first fluid flow between said main chamber and said first auxiliary chamber;
a first valve for movably blocking said first flow port;
a second flow port diposed between said main chamber and said second auxiliary chamber, said second flow port enabling a second fluid flow between said main chamber and said second auxiliary chamber;
a second valve for movable blocking said second flow port;
pressurized gas that fills said at least one auxiliary chamber and a remaining portion of said main chamber; and
a movable piston that compresses said pressurized gas in said main chamber and that displaces said liquid during a compression stroke of said gas spring.

* * * * *

UNITED STATES PATENT AND TRADEMARK OFFICE
CERTIFICATE OF CORRECTION

PATENT NO. : 10,018,239 B2
APPLICATION NO. : 14/929765
DATED : July 10, 2018
INVENTOR(S) : Robert C. Fox Page 1 of 1

It is certified that error appears in the above-identified patent and that said Letters Patent is hereby corrected as shown below:

On the Title Page

Column 2, item (57) ABSTRACT, Line 1:
Delete: "capbale"
Insert: --capable--

Column 2, item (57) ABSTRACT, Line 5:
Delete: "than for example,"
Insert: --than, for example,--

In the Claims

Column 12, Claim 4, Line 26:
Delete: "diposed"
Insert: --disposed--

Column 12, Claim 4, Line 30:
Delete: "movable"
Insert: --movably--

Signed and Sealed this
Fourth Day of September, 2018

Andrei Iancu
*Director of the United States Patent and Trademark Office*